United States Patent Office 3,461,245
Patented Aug. 12, 1969

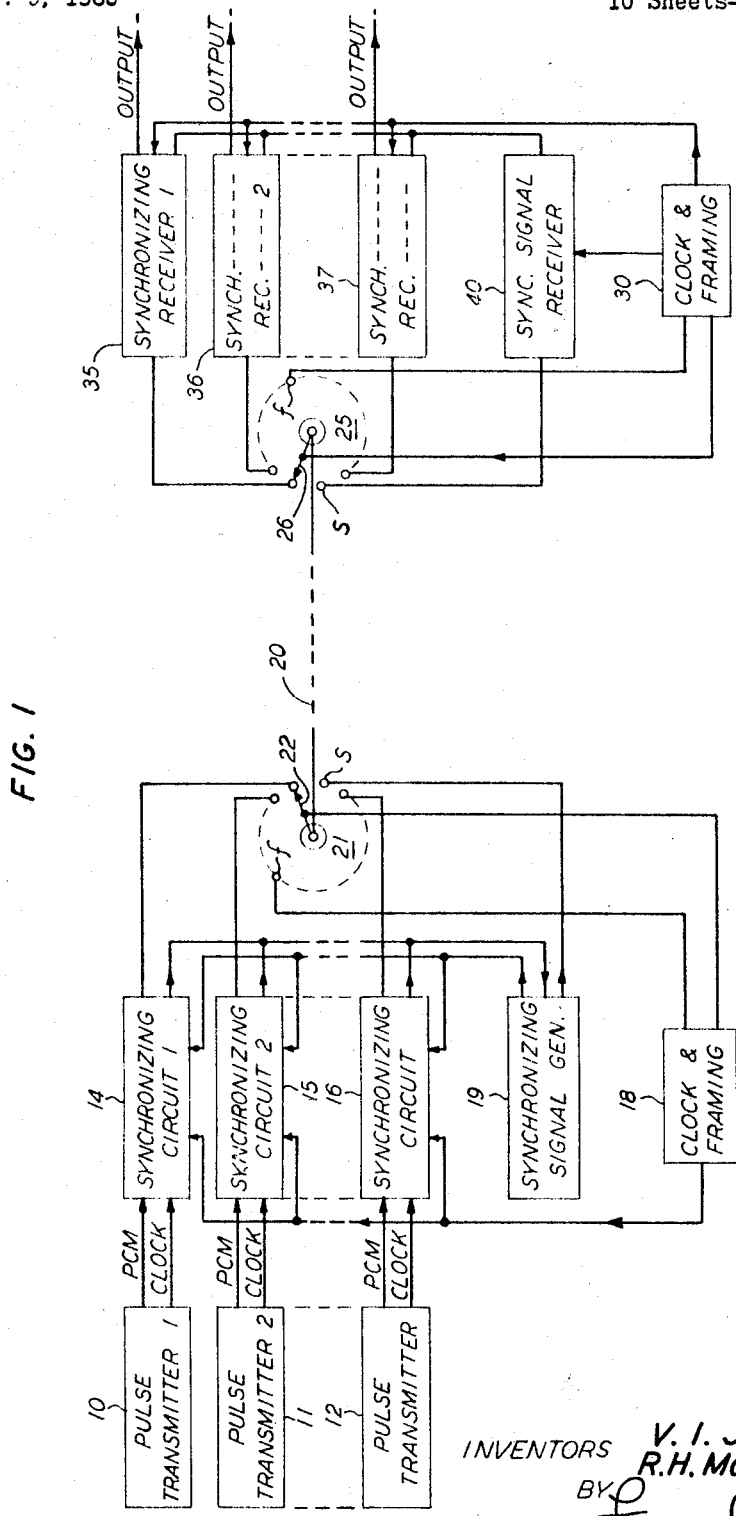

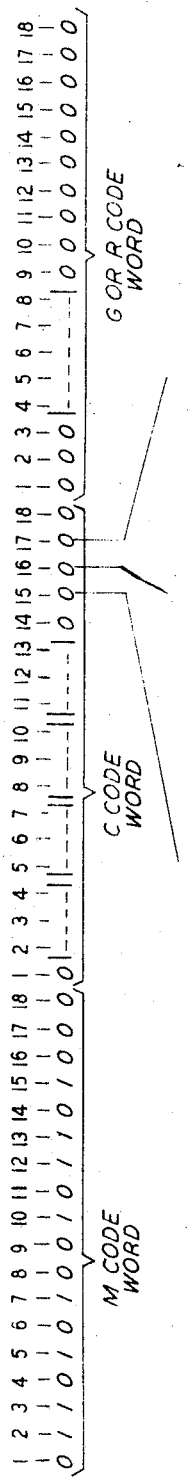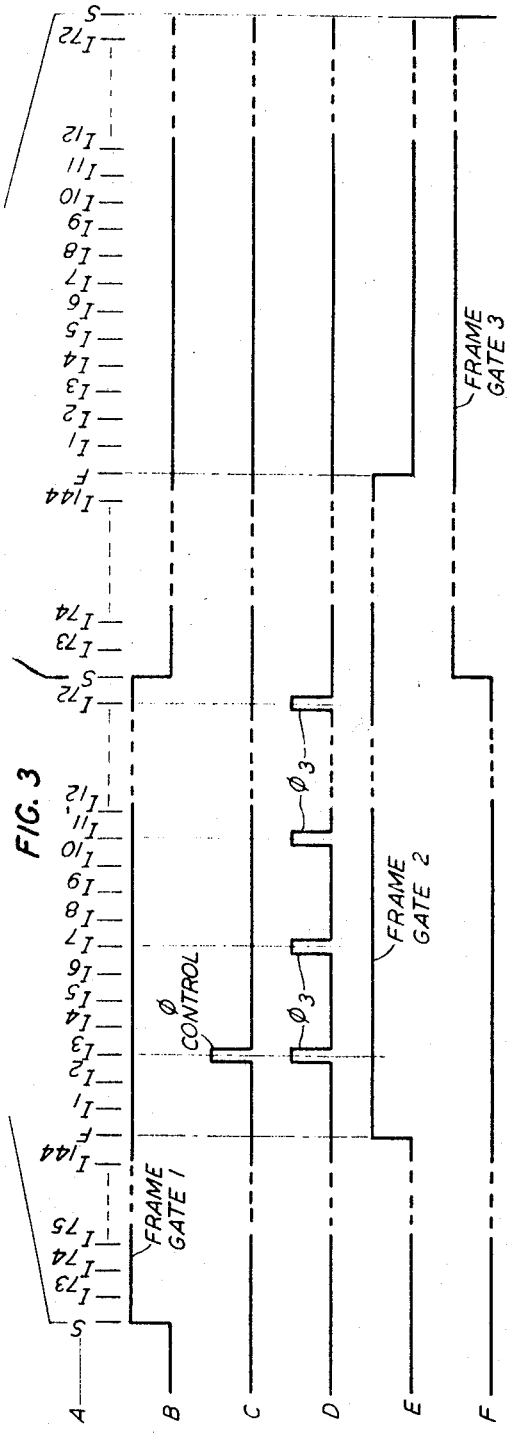

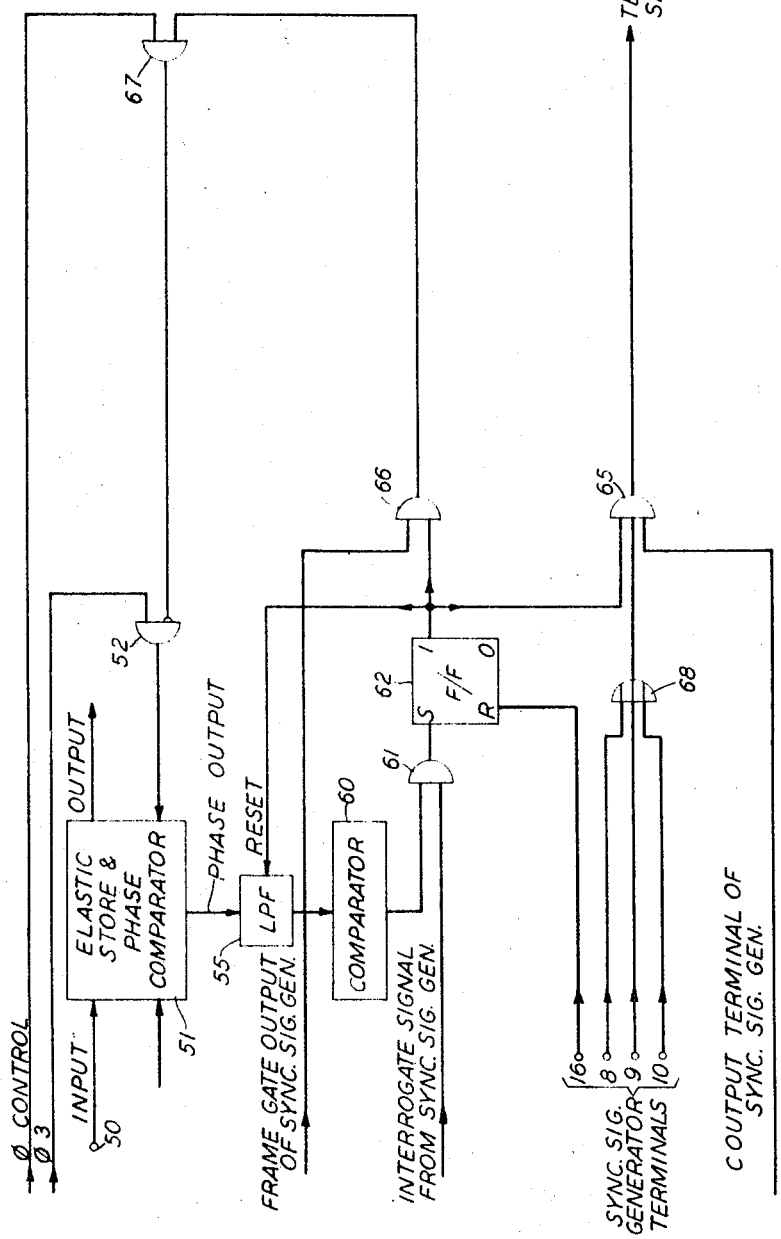

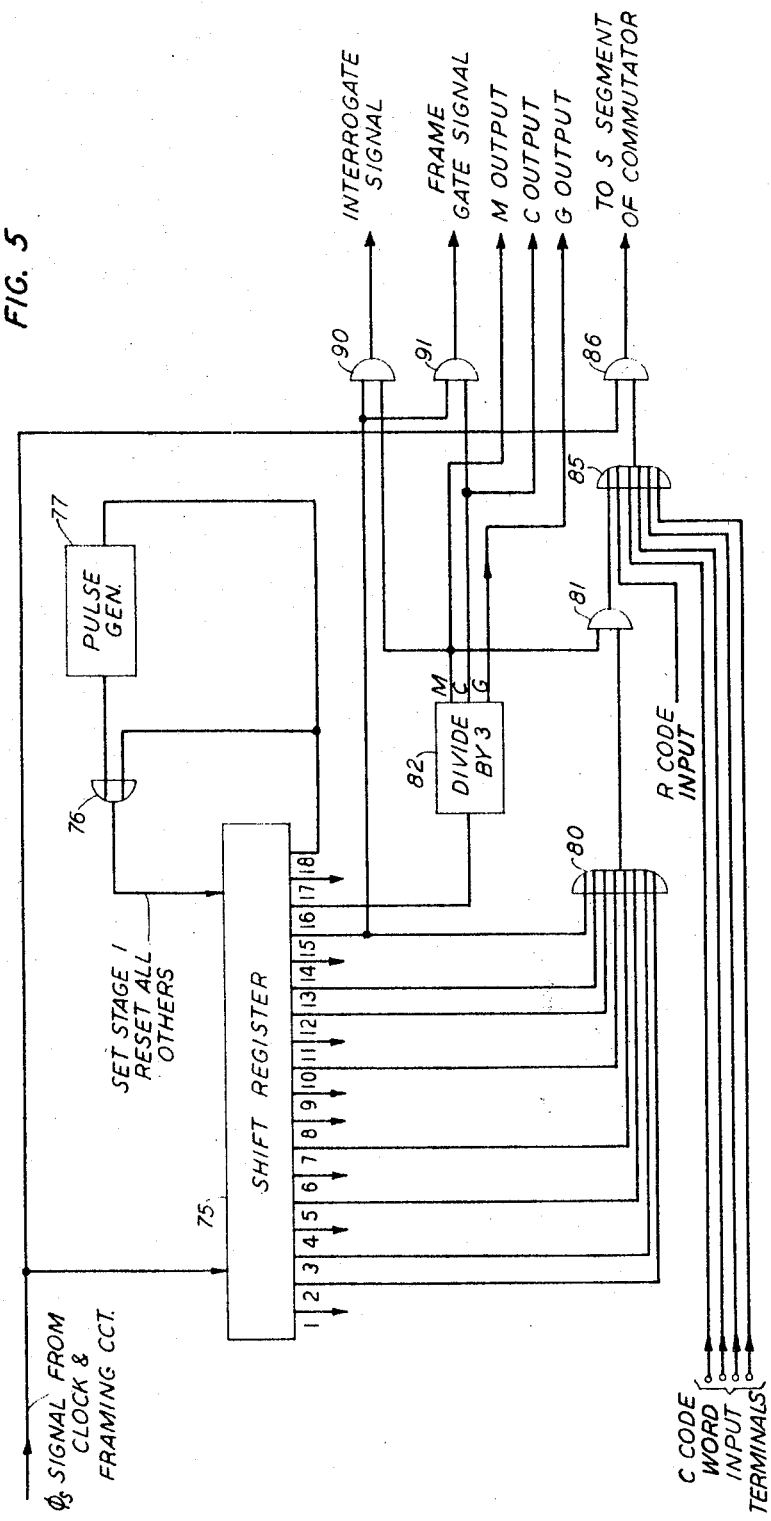

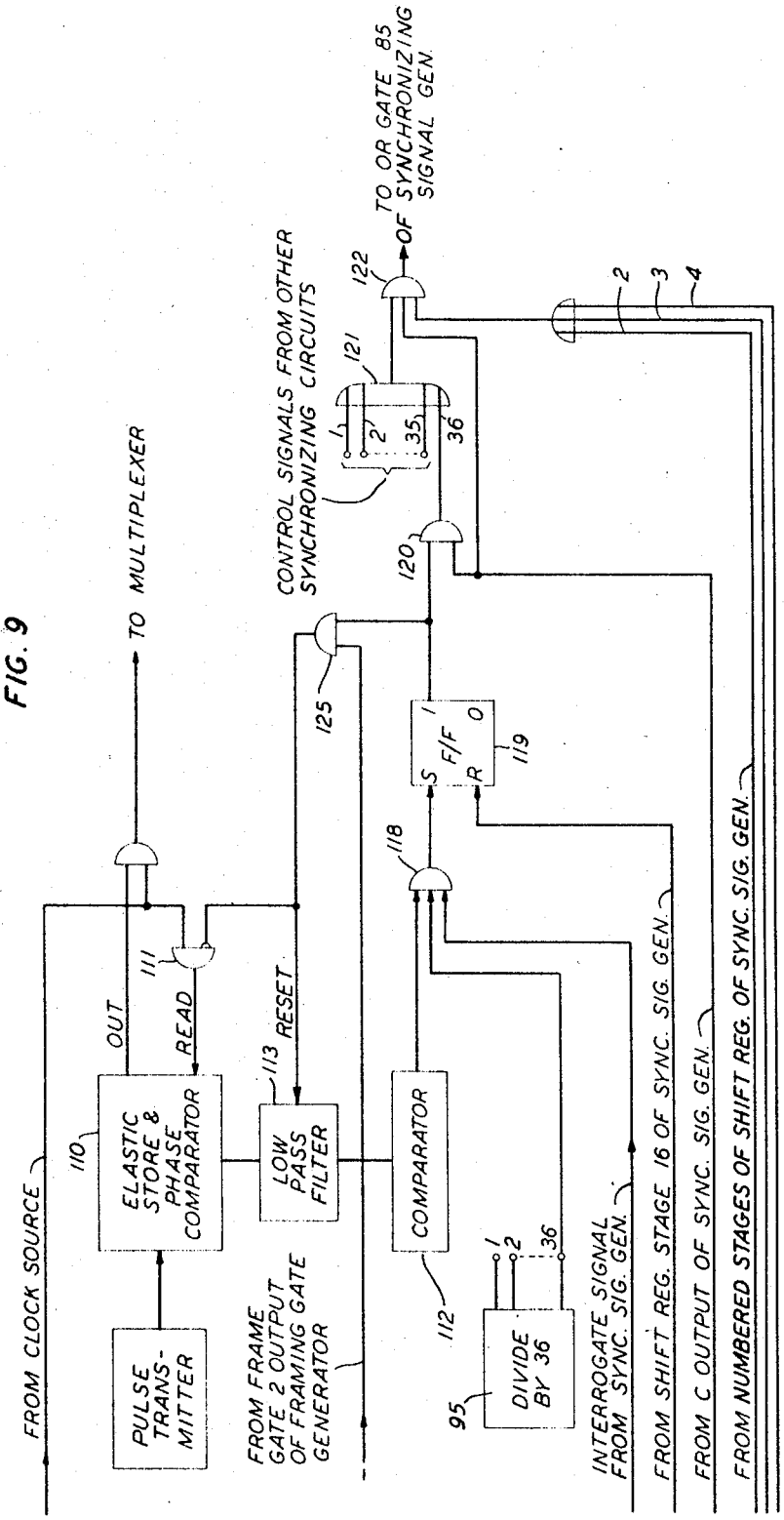

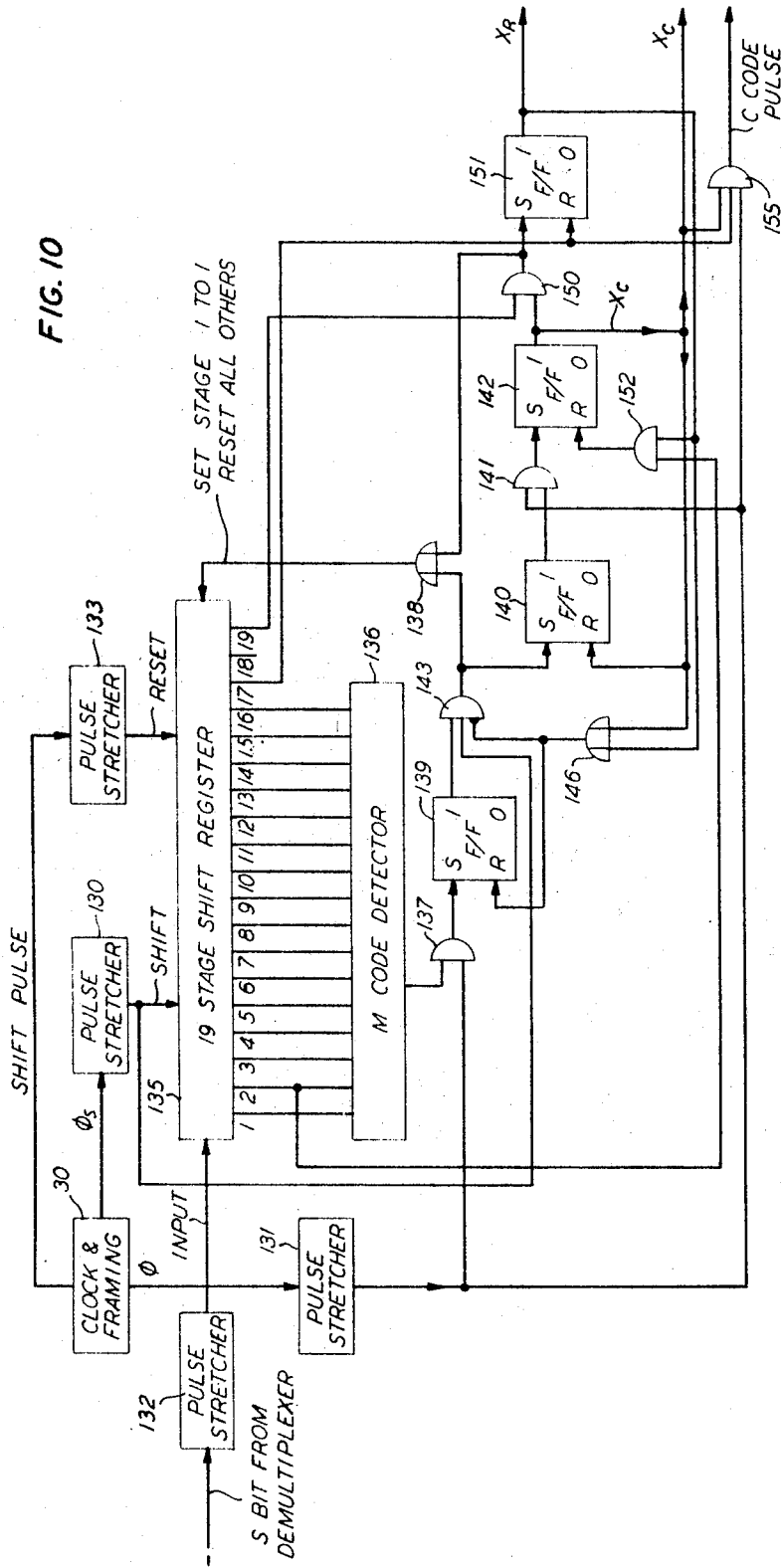

3,461,245
SYSTEM FOR TIME DIVISION MULTIPLEXED
SIGNALS FROM ASYNCHRONOUS PULSE
SOURCES BY INSERTING CONTROL PULSES
Virgil I. Johannes, Plainfield, and Richard H. McCullough,
Summit, N.J., assignors to Bell Telephone Laboratories,
Incorporated, New York, N.Y., a corporation of New
York
Filed Nov. 9, 1965, Ser. No. 507,008
Int. Cl. H04j 3/16, 3/18
U.S. Cl. 179—15           12 Claims

ABSTRACT OF THE DISCLOSURE

Pulse signals from a plurality of unsynchronous sources are time division multiplexed on a high speed transmission line by inserting control signals into each signal so as to raise each signal to a common repetition rate. The presence and location of the control pulses are transmitted by codes in a signal bit of the high speed frame, thereby minimizing the amount of channel space that must be used for signaling.

---

This invention relates to multiplex communication and more particularly to time division pulse multiplexing systems in which the various transmitters whose pulse signals are to be multiplexed are not synchronized.

In contemplating a pulse communication network of continental scope, pulse signals of relatively low pulse repetition frequency or speed will be interleaved or time division multiplexed with other such signals to form a high speed pulse signal for transmission on a common facility such as a transcontinental waveguide. The process of interleaving or time division multiplexing low speed signals into a high speed signal requires almost exact synchronization of the low speed signals. Otherwise, pulses will be lost in one or more of the slower pulse repetition frequency signals or pulses inadvertently added to the pulse signals of higher pulse repetition frequency. In either situation framing synchronization will be lost which has the effect of opening the circuit until framing is restored. When this happens information is lost.

Initially it might be though that this problem could be overcome by the use of a common clock signal transmitted to all parts of the communication network for synchronization purposes, but such a solution appears undesirable for several reasons. First, such a system would require expensive clock signal transmission facilities. Second, synchronization at the highest pulse rates requiring the greatest accuracy of timing is almost impossible due to variations of the parameters of the transmission facilities employed. For example, local variations in the transmission characteristics of such facilities due to temperature, humidity, and other local effects would cause changes in the effective pulse rate at the end of a pulse transmission system even though the input pulse rate was constant.

A number of proposals directed to the multiplexing of low speed signals onto a high speed long distance transmission facility using time division techniques have been made. A first, described in U.S. Patent 3,042,751, issued to R. S. Graham on July 3, 1962, describes a transmission system in which a plurality of asynchronous pulse trains derived from non-synchronized transmitters are retimed by a common clock source of slightly higher repetition rate than the highest pulse rate to be synchronized. To accomplish this result, a variable delay is included in the path of each pulse train and the delay continuously reduced at a rate sufficient to maintain synchronism with the clock source. Because the clock source is at a higher repetition rate than any of the asynchronous pulse trains, the reduction in delay eventually becomes a full pulse period, and at this time an extra pulse is inserted in the pulse train to bring its repetition rate up to that of the clock source. Simultaneously, the full delay is reinserted in the pulse path. In order to restore the original timing and delete the extraneous pulses, information concerning the value of the delay in each of the pulse paths is encoded and transmitted to the receivers.

A second proposal directed toward the solution of this problem is that disclosed in U.S. Patent 3,136,861, issued to J. S. Mayo on June 9, 1964. In that patent each pulse signal to be multiplexed has its pulse repetition rate raised to a common higher repetition frequency by the insertion of control signals into the pulse train and after multiplexing, transmitting, demultiplexing, and receiving the transmitted signal, predictive techniques are employed to remove the inserted control signals even in the presence of large transmission errors. The predictive techniques determine when a control signal should have occured in the transmitted signal, and when a control signal is lost due to transmission error this determination is used to minimize the loss of information due to framing error.

It is similarly an object of the present invention to synchronously combine or synchronously operate upon a plurality of asynchronous pulse trains of varying pulse repetition rate to retime each of the plurality of pulse trains to a common pulse repetition rate for transmission over a common time divided transmission facility.

In accordance with this invention, the repetition rates of pulse signals from a plurality of asynchronous pulse sources are raised to a common repetition rate for transmission on a high speed time divided facility. A control signal is inserted, when necessary, into the signal from each source at a unique time, different from that of every other source, with reference to a predetermined portion of the transmitted high speed signal. The presence and location of the control signals are signaled by transmitting code words in that predetermined portion of the high speed signal. A first transmitted code word, designated an M code word, establishes a time reference at the receiving terminal even in the presence of several transmission errors. Following the transmission of the M code word, a second series of code words, designated C code words, are transmitted to the receiving terminal. One such C code word is assigned to each of the multiplexed signals and its appearance is used to indicate that a control signal has been inserted in the respective signal. When a C code word indicates that the signal from a particular pulse transmitter has had a control signal inserted therein, it is removed by the receiving apparatus which is actuated at the proper time by the time reference established by the M code and the predetermined fact that each pulse transmitter has its control signals inserted at a unique time with reference to the predetermined portion of the common time divided transmission facility allocated for the transmission of each bit of the above-mentioned code words. In an illustrative embodiment of the invention a single bit of each frame, as will be defined below, is allocated to the transmission of the above-mentioned codes.

The invention will be more fully comprehended from the following determined description taken in conjunction with the drawings in which:

FIG. 1 is a simplified block diagram of a multiplexing system in accordance with the present invention;

FIG. 2 is an illustration of 54 bits of the signal transmitted in the predetermined bit of the high speed transmission signal allocated to the transmission of the control signal information;

FIG. 3 is a group of waveforms illustrating the times in which control signals are inserted into the signals from the pulse transmitters;

FIG. 4 is a block diagram of a synchronizing circuit shown in FIG. 1 for a relatively high speed pulse transmitter;

FIG. 5 is a block diagram of the synchronizing signal generator shown in FIG. 1;

FIG. 9 is a block diagram of a synchronizing circuit for multiplexing the signals from relatively low speed pulse transmitters;

FIG. 10 is a block diagram of the synchronizing signal receiver shown in the receiving terminal in FIG. 1;

Figure 6:
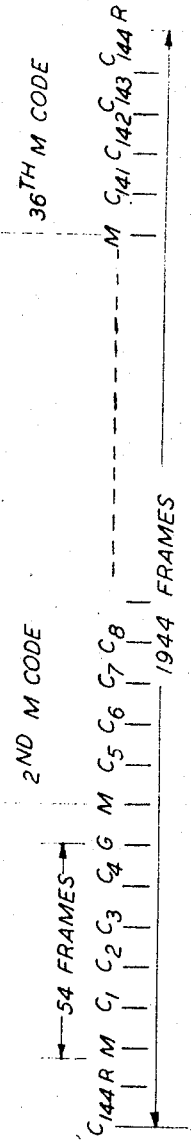
FIG. 6 is an illustration of the signals present in the predetermined bit allocated for the transmission of control information where both high speed and low speed pulse transmitters are to be multiplexed onto the high speed transmission facility.

A time division multiplexing system in accordance with the present invention is shown in block diagram form in FIG. 1. Pulse signals from a plurality of pulse transmitters 10, 11 . . . 12, which may be at geographically separated locations, are retimed to a common high pulse repetition frequency through the insertion of control signals by centrally located synchronizing circuits 14, 15 . . . 16. These are controlled by clock generator 18 and a synchronizing signal generator 19. The retimed signals are to be transmitted by time division multiplex techniques over a transmission facility 20, illustrated schematically as a line, which may in fact be a microwave waveguide or other high speed, high capacity system. The total time available on transmission facility 20 is divided into a sequence of discrete time intervals commonly called "time slots" or "bits" by means of a multiplex distributor herein represented as a commutator 21 which has $n$ segments. The retimed pulse signals from each synchronizing circuit 14, 15 . . . 16 are assigned to one or more time slots on transmission facility 20 by the connection of each synchronizing circuit to one or more segments of commutator 21 whose brush 22 is effectively driven by a signal from the clock and framing circuit 18. As a result, the retimed pulse signals are sequentially applied to the transmission facility 20 and a period of $n$ "bits" or "time slots" is designated as a frame of the transmission facility.

Two segments of commutator 21 are employed for the transmission of special information. A first, designated in FIG. 1 as the S segment, is connected to one output terminal of synchronizing signal generator 19 and the signals applied to segment S by generator 19 indicate which of the synchronizing circuits 14, 15 . . . 16 has inserted a control signal into the output of its respective pulse transmitters 10, 11 . . . 12. A second of the $n$ terminals, designated as the $f$ terminal in FIG. 1, is connected to one output terminal of the clock and framing circuit 18 and as a result framing signals are applied to this $f$ terminal so that the multiplexing and demultiplexing equipment may be kept in synchronism. The clock and framing circuit may be that described in U.S. Patent 2,984,706, issued to H. M. Jamison et al. on May 16, 1961.

At the distant end of transmission facility 20, the multiplexed signals are separated by the action of commutator 25 whose $n$ segments are sequentially contacted brush 26. The brush 26 is controlled by a clock and framing circuit 30 which recovers the basic pulse repetition rate of the transmitted signals and frames the transmitted signals so that brushes 22 and 26 are continuously in phase. For this purpose an input signal provided from the $f$ terminal of commutator 25 is supplied to the clock and framing circuit 30 while an output signal of clock and framing circuit 30 controls the operation of brush 26. As is well known in the art, commutators 21 and 25 may in fact be electronic commutators of any type, and the clock and framing circuit 30 may be that disclosed in U.S. Patent 2,527,650, issued to E. Petersen on Oct. 31, 1950.

Each segment of commutator 25, other than segments $f$ and $s$, is connected to a synchronizing receiver 35, 36 . . . 37 at which the control signals are removed under the control of synchronizing signal receiver 40 so that the output of each synchronizing receiver 35, 36 . . . 37 is identical to the output of each pulse transmitter 10, 11 . . . 12, respectively, and possesses the original timing of the signals.

Considering the transmitting terminal in somewhat more detail, the synchronizing circuits 14, 15 . . . 16 and the synchronizing signal generator 19 operate in the following manner. Under the control of the clock and framing circuit 18, pulse signals are read out of each synchronizing circuit at a rate which is somewhat greater than the rate at which the pulse signals are applied to the synchronizing circuit from its associated pulse transmitter. From time to time, therefore, each synchronizing circuit will approach a condition in which there is no pulse signal stored therein and, therefore, it is necessary to insert a control signal in the output of the synchronizing circuit so that due to the generation of the control signal additional pulse signals can be applied to the synchronizing circuit to cause its input to catch up with its output. When the generation of a control signal becomes necessary the synchronizing circuit concerned generates a signal which is applied to the synchronizing signal generator 19 to inform the synchronizing signal generator that a control signal is about to be inserted in the output of the synchronizing circuit.

Prior to the necessity for the insertion of a control signal into the output of any of the synchronizing circuits, synchronizing signal generator 19 has been applying a predetermined signal to that segment of commutator 21 denoted as the S segment in FIG. 1. Thus, in each S bit or time slot which occurs once each frame, a frame being defined above, predetermined pulse signals are applied to the transmission medium. In the illustrative embodiment of this invention these signals are divided into groups of 54 bits with each group consisting of three code words of eighteen bits each as shown in FIG. 2. In the absence of the necessity for the insertion of a control pulse in the output of any of the synchronizing circuits, the signal applied to the S segment of commutator 21 is the so-called M code word shown in the first eighteen S bits followed by thirty-six zeros. This code pattern of fifty-four bits comprising three groups of eighteen bit words is continuously repeated in the absence of the necessity for the transmission of a control signal and functions not only to inform the receiving apparatus that no control signals are being inserted at the output of any of the synchronizing circuits 14, 15 . . . 16 but also to create a time reference for the receiving apparatus such that, as will be explained later, the receiving apparatus is able to create a time reference to delete an inserted control signal even if there is an error in transmission.

At a time corresponding to the fifteenth bit of M code word an interrogate signal is generated by the synchronizing signal generator 19 and applied to all the synchronizing circuits 14, 15 ... 16. If any of these synchronizing circuits require that a control signal be inserted in their output, they generate a signal which, as before described, activates the synchronizing signal generator which then generates a predetermined code during the second through thirteenth time slots of the S bit of the transmitted signal in the second group of eighteen S bits shown in FIG. 2. This C code informs the receiving apparatus as to which of the synchronizing circuits 14, 15 ... 16 has inserted a control signal in its output.

Each synchronizing circuit 14, 15 ... 16 inserts a control signal in its output in a predetermined time slot of the one or more time slots devoted to the transmission of signals from that synchronizing circuit over the transmission medium. In an illustrative embodiment of this invention these predetermined time slots occur either in the frame, as defined above, occurring between the fifteenth and sixteenth or sixteenth and seventeenth S time slots of the C code word shown in FIG. 2. FIG. 3 shows the time interval between the fifteenth and seventeenth S time slots. In FIG. 3B, S designates the S time slot, of which three are shown. They are the fifteenth, sixteenth, and seventeenth and this is indicated by the interconnecting lines between FIGS. 2 and 3. The framing time slot is designated, F, in FIG. 3A and the time slots devoted to the transmission of information are designated, I, with an appropriate subscript to indicate the number of the information time slot with respect to the framing pulse. In the illustrative embodiment of the invention, as is shown, the S bit occurs between the 72nd and 73rd information time slots. The remaining drawings in FIG. 3 will be referred to below.

Since the M code establishes, even in the presence of transmission errors, a time reference for the receiving apparatus, the receiving apparatus is able to accurately locate the bit of the transmission frame in which a control signal has been inserted and to remove that control signal.

The synchronizing signal receiver 40 at the receiving terminal receives the codes transmitted during the S bits of the transmission frame, generates the time reference, and determines which of the synchronizing circuits 14, 15 ... 16, if any, has inserted a control signal in its output. The synchronizing signal receiver 40 upon such a determination activates that one of the synchronizing receivers 35, 36 ... 37 so that the control signal is removed from the demultiplexed signal by the synchronizing receiver 35, 36 ... 37 associated with a predetermined one of the synchronizing circuits 14, 15 ... 16.

A typical synchronizing circuit 14, 15 ... 16 for converting the asynchronizing pulse trains to trains of higher repetition frequency is shown in FIG. 4. The input signal from the respective pulse transmitter 10, 11 ... 12 is applied to the input terminal 50 of the synchronizing circuit. The terminal 50 is connected to the input of an elastic store such as that shown in U.S. Patent 3,093,815 issued to M. Karnaugh on June 11, 1963. In such a store the input pulses may be read out at a repetition rate which is different from the rate at which they are read in and stored. In addition, there is provided an output voltage, called the phase output voltage, which is a measure of the difference in phase between the input and output signals, i.e., it is proportional to the number of pulses stored. In the above-mentioned patent, the data are read out of the store under the control of an oscillator which in turn is controlled by the phase output voltage. In its use in the present system, this control circuit is eliminated and the readout governed under the control of external circuitry to be described below.

A multiplexing system embodying this invention will first be described where the pulse signals from four pulse transmitters of the same capacity are to be multiplexed. Thus, if the transmission system has a speed of 220 megabits per second, the signals from four 55 megabit per second pulse transmitters will be described as being multiplexed thereon. In such an embodiment of the invention a pulse signal from each pulse transmitter is transmitted in every fourth information bit of the transmitted signal. Furthermore, as an example, consider that the apparatus shown in FIG. 4 corresponds to the synchronizing circuit associated with a pulse transmitter whose pulse signals are transmitted in the third, seventh, eleventh ... etc. information time slots of each frame of the transmitted signal.

Under the control of the clock and framing circuit 18, pulses are generated during the third, seventh, eleventh ... etc. information time slots of each frame of the transmitted signal by well known techniques involving frequency division. These signals, designated $\varphi_3$, and shown in FIG. 3D, are applied through inhibit gate 52 to the read terminal of elastic store 51 and in response to each such signal a pulse signal is read out of the store. Thus, the input signal at terminal 50 is read out onto the transmission facility under the control of the $\varphi_3$ output signal, and this process continues until the pulse signals stored in store 51 have been drained to a predetermined level such that it is necessary to insert a control signal in the output of the elastic store.

The quantity of signals stored in store 51 is periodically examined by apparatus enabled by an interrogate signal from the synchronizing signal generator to be described in detail below. The interrogate signal occurs simultaneously with the fifteenth bit of each M code word and when the quantity of the signals stored in store 51 has been drained to a predetermined level the phase output voltage of the store, applied through a low pass filter 55 to a comparator circuit 60, causes the comparator circuit 60 to generate an output signal. The output signal of comparator 60 is applied to the input terminal of AND gate 61 which is enabled by the interrogate signal, and the resulting output signal sets a bistable circuit 62.

The output signal generated by bistable circuit 62 has three functions. First, it serves to apply three marking pulses to the synchronizing signal generator so that the synchronizing signal generator generates three marking pulses in the eighth, ninth, and tenth S time slots of the C code word. This is accomplished by the actuation of AND gate 65 which is enabled during the eighth, ninth, and tenth time slots of the C code word by signals applied by the synchronizing signal generator 19 through OR gate 68 so that the output of bistable circuit 62 causes marking pulses to be transmitted. The resulting C code word serves to inform the receiver that a control signal is being inserted in the time slot assigned to the third transmitter. Second, the output signal from bistable circuit 62 enables AND gate 66 during the presence of a gating signal, generated by the synchronizing signal generator 19 and shown in FIG. 3B which occurs in the transmitting period bounded by the fifteenth and sixteenth S time slots of the C code word. Thus, when bistable circuit 62 produces an output signal indicating that a control signal is to be present in the output of store 51, this control signal can only be inserted in the transmitting period bounded by the fifteenth and sixteenth S bits of the C code word. The output signal from AND gate 66, which is a gating signal, shown in FIG. 3B, occurring between the fifteenth and the sixteenth S time slots, enables a second AND gate 67. A signal present during a predetermined time slot of that transmission frame, in this example, the third message time slot, causes AND gate 67 to produce an output signal which inhibits inhibit gate 52 so that no information is read out of elastic store 51 during that predetermined time slot. This signal which causes AND gate 67 to generate an output signal is designated $\varphi_{control}$ and is shown in FIG. 3C. Third, the output from bistable circuit 62 resets low pass filter 55 so that the output voltage of low pass filter 55 is at a predetermined initial value.

Thus, in summary, the synchronizing circuit shown in FIG. 4 operates in the following manner. When a control signal is to be inserted in the transmitted signal, it is inserted at a predetermined time determined by a $\varphi_{control}$ pulse. That is to say, control signals are inserted into the output of a pulse transmitter in a predetermined one of the time slots in a given frame allocated to the transmission of pulse signals from that transmitter. In this example, a control signal is inserted into the first time slot of the transmitting period bounded by the fifteenth and sixteenth S time slots which is allocated to the transmission of information signals from the third pulse transmitter. This is accomplished by generating at the synchronizing signal generator a gating signal shown in FIG. 3B during the transmitting period in which the control signal is to be inserted, and generating a control signal occurring during the predetermined time slot allocated for the insertion of control signals when such insertion is necessary. To indicate that a control signal has been inserted in a predetermined time slot, a C code word is generated and serves to inform the receiver which synchronizing circuit has inserted a control signal so that the receiver may remove it.

Each of the other three pulse transmitters in our present example has a synchronizing circuit associated with it. These synchronizing circuits differ only in the time that a control signal is inserted into the output of the pulse transmitter. Thus, a first of the synchronizing circuits transmits pulses from a first pulse transmitter in the first, fifth, ninth . . . etc. information time slots of each frame, and control signals may be inserted, when necessary, in the first time slot of the transmitting period occurring between the fifteenth and sixteenth S bits. The C code word indicating that a control signal has been inserted in the signals from a first pulse transmitter is three marking pulses in the second through fourth time slots of the C code word. AND gate 65 in a synchronizing circuit associated with such a pulse transmitter is therefore caused to produce marking pulses during the second, third, and fourth time slots of the C code word.

The synchronizing signal generator 19 which controls the operation of the synchronizing circuits is shown in block diagram form in FIG. 5. It has four functions, which are: (1) to generate the interrogate signal during the fifteenth time slot of the M code word, (2) to generate the M code, (3) to generate the gating signal in the transmitting period between the fifteenth and sixteenth bits of the C code, and (4) to transmit any C codes generated by the synchronizing circuits.

To accomplish these results a marking pulse occurring in each S bit is applied to an eighteen stage shift register 75. Initially shift register 75 has all stages in the reset position save the first stage which is in the set position. Each pulse occurring during the S bit, designated $\varphi_s$, shifts the storage register so that the marking pulse stored in the first stage of the register is sequentially shifted through the eighteen stages.

To insure that this procedure continues, the appearance of an output marking pulse at the output terminal of the eighteenth stage of the shift register 75 causes OR gate 76 to be enabled, and the output marking pulse therefrom is amplified and reapplied to the eighteen stage shift register to drive the first stage into the set condition and all others into the reset condition in accordance with techniques well known in the art. A pulse generator 77 has its output terminal applied to a second input terminal of OR gate 76, and generator 77 normally generates a marking pulse once every thirty-six frames of the transmission system unless inhibited by an output signal from the output terminal of the eighteenth stage of shift register 75. Thus, if for some reason a marking pulse is not driven through the shift register in the manner above described, pulse generator 77 will generate, after thirty-six S bits have occurred, a marking pulse to set stage 1 of the shift register to the set condition and reset all the other stages. Thus, generator 77 serves to insure the proper operation of this shift register in the event that the marking pulse being shifted through the register is lost due to circuit error.

Among the functions of the synchronizing signal generator shown in FIG. 5 is to generate the M code word, the C code word, and two other possible codes which follow the C code. The M code word comprises the pattern 0110101001011010000, and the reasons for this particular code pattern will be discussed below in connection with the description of the synchronizing receivers. Accordingly, the M code is generated by applying the outputs from the second, third, fifth, seventh, tenth, twelfth, thirteenth, and fifteenth bistable circuits of shift register 75 to an OR gate 80 so that during the occurrence of the second, third, fifth, seventh, tenth, twelfth, thirteenth, and fifteenth S bits OR gate 80 generates a mark. During the recurrence of the others of the first eighteen output pulses from shift register 75, the output of OR gate 80 is a space. Thus, the output of OR gate 80 consists of the required M code and the output from OR gate 80 is applied to AND gate 81 which is enabled during the first sixteen bits of the first group of eighteen bits of the S signal by a signal generated by a divide by three circuit 82.

The function of the divide by three circuit 82 is to divide each group of fifty-four bits of the S code into three groups of eighteen bits each in which groups the M, C, and G or R codes are located, the latter to be discussed below. To accomplish this result the divide by three circuit 82 has its input terminal connected to the output terminal of the sixteenth stage of shift register 75 and has three output terminals designated M, C, and G, respectively. Initially, a voltage appears at the M output terminal of divide by three circuit 82 and in response to the first output signal from the sixteenth stage of shift register 75 the reference voltage is shifted to the C output terminal of divide by three circuit 82. Similarly, in response to the third and fourth output signals from the sixteenth stage of shift register 75, a reference voltage again appears at the G and then M output terminals of divide by three circuit 82. Thus, AND gate 81 is enabled during the time for transmission of the M code by the reference voltage present at its input terminal connected to the M output terminal of divide by three circuit 82. Accordingly, the output of OR gate 80 is transmitted through AND gate 81 and thence through OR gate 85 and applied to the S segment of commutator 21 by being gated through AND gate 86 under the control of the $\phi_s$ signal from the clock and framing circuit.

When a synchronizing circuit inserts a control signal into the signal supplied by its respective pulse transmitter, a C code is generated by AND gate 65 and its associated apparatus in the synchronizing circuit associated with that pulse transmitter, as above described. The signals generated by the AND gates 65 of each synchronizing circuit are applied to one input terminal of OR gate 85 and thence gated onto the transmission line during the S bit to indicate to the receiving apparatus which of the synchronizing circuits has inserted a control signal into the pulse signal from its associated transmitter. In addition, an R code input terminal is applied to OR gate 85 and although this signal and the gate for its generation will be described in detail below, it suffices for now to note that it is associated with the multiplexing of signals from pulse transmitters having different pulse repetition rates.

The interrogate signals and the frame gate signals needed for the operation of the synchronizing circuits above described are generated by the output signals from divide by three circuit 82 and the output signal from the fifteenth stage of shift register 75. The M output signal of divide by three circuit 82 and the output of the fifteenth stage of shift register 75 are applied to AND gate 90 to generate the interrogate signal which occurs during the fifteenth bit of each M code. The frame gate signal, for pulse transmitters having the same repetition rate, is generated by AND gate 91 which is enabled by the output signal from the fifteenth stage of shift register 75 and the signal present at the C output terminal of the divide by three circuit 82 to generate a frame gate signal which begins upon the occurrence of the fifteenth S bit and terminates upon the occurrence of the sixteenth S bit of the C code so that control signals are inserted during this time. The frame gate signal is shown in FIG. 3B.

In the description given above for the multiplexing of four pulse transmitters onto a high speed transmission line, each of the four pulse transmitters might, for example, be a source of pulses of approximately a 55 megabit per second rate and the line a 220 megabit per second high speed transmission line. Sometimes it is desirable not only to be able to time division multiplex such high speed sources on the line but also to be able to multiplex a large number of relatively low speed sources onto such a line. For example, the regenerative pulse transmission system described on pp. 1–24 of the January 1962 issue of the Bell System Technical Journal by C. G. Davis operates at a 1.544 megabit per second rate, and it is therefore possible to multiplex the pulse signals from 144 of such transmission systems onto a 220 megabit per second high speed line. For this purpose and where both high and low speed sources are multiplexed the equipment described above must be modified so that the possibility of error in transmitting information regarding the insertion of control signals is minimized and in addition the insertion of control signals into each channel occurs at the closest possible time to the generation of a C code word indicating that the pulse signal from that transmitter has had a control pulse inserted therein.

To accomplish the former purpose, namely minimizing error in transmission of information as to when and where a control signal has been inserted, the overall make-up of the C and M code words has to be modified from that described above. Whereas before an M code word was transmitted followed by the generation of a C code word which denoted which, if any, of the four transmitters had a control signal inserted in its output where 144 relatively low speed pulse transmitters are to be multiplexed an extension of the above method would require the transmission of a first M code word followed by the transmission of a C code word of at least 144 parts, each part comprising three bits or time slots. As a result, any transmission error resulting in an out-of-frame condition during the transmission of either the initial M code or any of the following C codes would result in the entire system being out of frame without the possibility of restoration until the generation of the next M code which does not occur until approximately 450 additional transmission frames have occurred. Such an out-of-frame condition is almost intolerable.

To minimize the length of time in which the system can be out of frame, the signal transmitted during the S time slot is modified in the following manner. Instead of transmitting an M code word followed by a C code word composed of three bits for each pulse transmitter and then a continuous train of zeros during the so-called G code word, the original allocation of eighteen S bits for the C code is maintained and a so-called R code word is generated during one out of every thirty-six G code word time intervals. The resulting R code word is used as a framing signal in the S time slot so that the signals appearing in the S time slot have an R code word generated once every 1944 frames (36 code intervals 1 x 54 bits per interval) of the transmission signal. In addition, the M and C code words are transmitted in the following manner. Following the initial generation of an R code word, an M code word is generated, followed by a C code word of four parts which are allocated to the first four pulse transmitters. A G code word of eighteen zeros or spaces is then generated, and then a second M code word. The second M code word is followed by a C code word representing the fifth through eighth pulse transmitters, followed by the generation of a second G code word. A third M code word is then generated, followed by a C code word composed of four parts which are allocated to the ninth through twelfth pulse transmitters.

This process, shown diagrammatically in FIG. 6, shows that an M code word is generated once every fifty-four frames on the transmission line. As a result proper identification of C code words associated with high speed sources is resumed within fifty-four frames after an error in receiving an M code.

Figure 7:
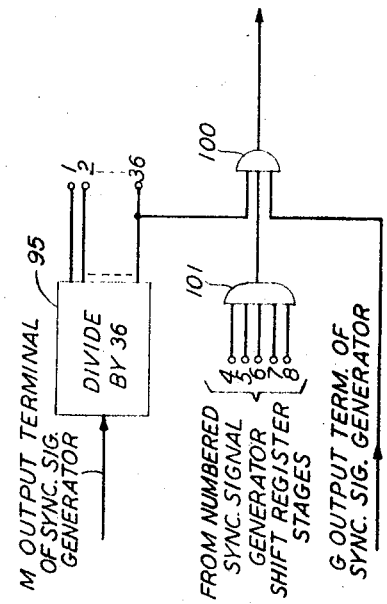
FIG. 7 is a block diagram of a so-called commutator circuit for multiplexing relatively low speed pulse transmitters.

The R code word is generated by apparatus connected to the R input terminal or OR gate 85 of the synchronizing signal generator shown in FIG. 5. This apparatus is shown in FIG. 7 and comprises a divide by thirty-six circuit 95 connected to receive the M output signals from divide by three circuit 82 shown in FIG. 5. The divide by thirty-six circuit 95 has thirty-six output terminals which are sequentially actuated in response to each received M output signal from the synchronizing signal generator so that the thirty-sixth output terminal is actuated after the generation of the thirty-sixth M code word. During his time interval and upon the occurrence of the G code word interval, AND gate 100 is enabled so that during the G code word interval following the thirty-sixth M code word instead of a G code word being generated, which G code word would be a consecutive train of spaces, an R code word is generated. The R code word consists of marks in the fourth through eighth time slots of the G code word time interval. To generate such a signal, the output of OR gate 101, whose input terminals are connected to the fourth, fifth, sixth, seventh, and eighth output terminals of shift register 75 of the synchronizing signal generator, is connected to a third input terminal of AND gate 100 so that during the occurrence of the G code word following the thirty-sixth M code word input pulses are applied to the S segment of the commutator during the fourth, fifth, sixth, seventh, and eighth bits of what would have been the G code word. This resulting signal is the R code word which serves to frame the signals generated in the S bit pattern so that in the receiver each of the C codes may be recognized as corresponding to a particular one of the low speed pulse sources.

Figure 8:
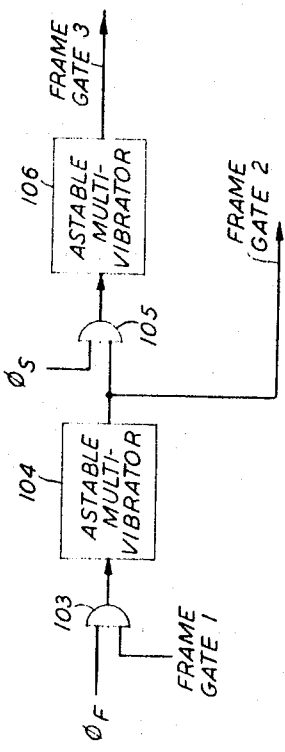
FIG. 8 is a block diagram of a frame gate generator which generates gating signals to control the insertion of control signals into the pulse signals from relatively low speed pulse transmitters.

Whereas in the embodiment of the invention in which four high speed pulse transmitters were multiplexed onto the very high speed transmission system and control pulses were inserted during the transmitting period bounded by the fifteenth and sixteenth bits of the C code word, it is sometimes desirable, particularly where high speed and low speed pulse transmitters are multiplexed onto a very high speed transmission medium, to insert the control pulses for the various transmitters over a greater period of time. As an example, where 144 sources are to be multiplexed onto the high speed line, control signals might be inserted between the fifteenth and seventeenth S bits of the C code word. For this purpose it is necessary to generate two additional frame gates in addition to the frame gate shown in FIG. 3B. To accomplish this a frame gate generator circuit shown in FIG. 8 is employed and comprises an AND gate 103 which is actuated upon the occurrence of a framing pulse and frame gate number one. The output of AND gate 103 in turn enables an astable multivibrator 104 which generates a second frame gate signal approximately one frame long. Since the S bit and F bits are separated in time by approximately one-half frame, this second frame gate signal begins one-half frame later than frame gate signal 1 and is shown in FIG. 3E. This second frame gate signal drives apparatus, to be described below, and is also utilized together with the next occurring S bit to actuate a second astable multivibrator 106 which generates a third frame gate signal in a similar manner. The resulting third frame gate signal is shown in FIG. 3F.

Thus, three frame gate signals are generated in a transmitting period bounded by the fifteenth and seventeenth S bits of the C code. Theoretically, only two such frame gate signals would be required to gate control signals into the outputs of the pulse transmitters during these two frames since each gating signal is one frame long where a frame is a transmitting period bounded by S bits. Due to the practical difficulty of generating gate signals with such short rise and fall times, however, only the center portions of these frame gate signals are employed with one quarter of each gate signal at the beginning and end of the signal not being utilized. As a result, a minimum of three frame gate signals, as shown, are required.

A synchronizing circuit for synchronizing each low speed pulse signal from a pulse transmitter onto a high speed transmission medium is shown in FIG. 9. The circuitry shown in FIG. 9 is analogous to that shown in FIG. 4 but with a number of differences so that the apparatus can accommodate the relatively low speed signals from the pulse transmitter. The signals from the pulse transmitter are applied to an elastic store 110 and are read out during a predetermined one of the bits in each transmission frame of the high speed transmission medium under the control of a clock signal from the clock source which is applied to the read terminal through inhibit gate 111. Such read out from the store continues until the signals stored have reached a level such that it is desirable to insert a control signal into the time slot in the transmission frame allocated for transmitting signals from this particular pulse transmitter. When the quantity of information stored in store 110 is drained to the predetermined level, that level is detected by a comparator 112 which is connected to the phase voltage output terminal of store 110 through a low pass filter 113. The output of comparator circuit 112, together with the interrogate signal generated by the synchronizing signal circuit, are used to generate the C code word indicating that this particular pulse transmitter is going to have a control signal inserted at a predetermined time during the generation of the C code word. Since it is desirable to interrogate each pulse transmitter at a time immediately preceding the generation of a C code word corresponding to that transmitter, the interrogate signal is gated through AND gate 118 only when the output of the divide by thirty-six circuit 95, shown also in FIG. 7, generates a signal upon the occurrence of the M code word immediately preceding the C code word allocated to that pulse transmitter.

For purposes of the present explanation it is assumed that the synchronizing circiut shown in FIG. 9 corresponds to the first pulse transmitter of the thirty-sixth group of four pulse transmitters of 1½ megabit per second rate to be multiplexed over a 220 megabit per second pulse transmission system. Thus AND gate 118 produces an interrogate output signal only during the generation of the thirty-sixth M code to interrogate the 141st through 144th pulse transmitters. The output of AND gate 118 sets bistable circuit 119, whose output is used to generate the C code word and also to generate the control signal by inhibiting the read out of elastic store 110.

To generate the C code word the "1" output terminal of bistable circuit 119 is applied to an AND gate 120 which is enabled by the C output of the synchronizing signal generator so that a signal is generated at the output terminal of AND gate 120 during the C code word time interval of the S bit signal following the thirty-sixth M code word. The output signal from AND gate 120 is applied through an OR gate 121 and thence to an AND gate 122. AND gate 122 is enabled during the second, third, and fourth time slots of the C code word by the output of the synchronizing signal generator so that the signal generated at the output of AND gate 122 is the C code indicating that the first pulse transmitter of the thirty-sixth group of four is having a control signal inserted in its output at a predetermined time. OR gate 121 is also connected to receive the output signals from corresponding synchronizing circuits which are each associated with the first of each group of four pulse transmitters into which the 144 transmitters are divided. Thus, whenever the first of each such group of four pulse transmitters is having a control signal inserted in its output, a marking pulse is generated during the second, third, and fourth time slots of the C code word following the M code word corresponding to its group.

Finally, the "1" output terminal of bistable circuit 119 is applied to AND gate 125 which is enabled by the frame gate 2 signal from the framing gate generator to inhibit the read out of elastic store 110 during the time interval between the sixteenth and seventeenth time slots of the C code word following the thirty-sixth M code word. In addition, the output of AND gate 125 clamps the phase output voltage of low pass filter 113 to a predetermined value while bistable circuit 119 is reset by the signal from stage 16 of shift register 75 of the synchronizing signal generator.

While the transmitting terminal of the pulse multiplexing system has been described as being capable of multiplexing, as an example, four high speed 55 megabit per second sources or 144 low speed 1.5 megabit per second sources on a 220 megabit per second facility, it should be recognized that the signals from both high and low speed pulse transmitters may be multiplexed onto the very high speed transmission facility at the same time. Thus, where the transmission facility transmits 220 megabits per second, not only is it capable of handling four 55 megabit per second sources or 144 1.5 megabit per second sources, but other combinations of source, such as three 55 megabit per second sources and thirty-six 1.5 megabit per second pulse transmitters, may be transmitted. Where three 55 megabit per second pulse transmitters have their signals multiplexed onto the transmission facility together with thirty-six low speed sources, the transmission frame of the transmission facility is divided into groups of four information bits each. Three of every four bits are allocated to the high speed sources, while a fourth bit is allocated to a different one of each of the low speed sources. In considering the receiving terminal in accordance with the invention, consider, solely as an example, that three such high speed pulse transmitters are multiplexed with thirty-six low speed pulse transmitters. The first bit of each group of four bits is allocated to a different one of the low speed sources while the remaining three bits of each group are allocated to the high speed sources.

Where low speed and high speed signals are so multiplexed, the S bit pattern shown in FIG. 6 is employed. There are thirty-six groups of C code words separated in time by thirty-six M code words with an R code word employed, as before described, to frame the S bit signal. The first portion of each C code word of each group of thirty-six C code words is allocated to a particular one of the thirty-six low speed transmitters, while the remaining three portions of each code word are allocated to the high speed transmitters.

At the receiving terminal of such an asynchronous pulse multiplexing system, as shown in FIG. 1, a so-called synchronizing signal receiver 40 is employed to govern, in part, the removal of the inserted control signals. The synchronizing signal receiver accordingly has three functions. The first function is to recognize a transmitted M code word. The second function is to generate a signal to inform the synchronizing receivers 35, 36 . . . 37 when to check for the presence of C code words. This latter signal is designated as an $X_C$ signal in FIGS. 10, 11, and 13. Third, the synchronizing signal receiver functions to inform the commutating equipment shown in FIG. 12 when to look for the presence of an R code word so that the signals transmitted in the S bit may be properly framed.

The clock and framing circuit 30 at the receiving terminal supplies marks designated $\varphi_s$ and $\varphi_f$ during the time slots assigned to each S bit and each F bit, respectively, These pulses, which are relatively narrow pulses, are widened by pulse stretchers 130 and 131, respectively. The input signal to shift register 135 comprises the signals taken from the S segment of commutator 25 and stretched by pulse stretcher 132, and these signals are shifted through the nineteen stage shift register 135 under the control of the $\varphi_s$ signal occurring during each S bit so that after nineteen S bits have been received the first M code word is represented at the nineteen output terminals of shift register 135.

The seventeenth and eighteenth bits of the M code word are zeros or spaces which provide spacing between the M and C code words. The first sixteen of these S bits therefore represents the significant portion of the M code word and an M code detector 136 or count comparator such as that described in copending application of C. G. Davis and L. C. Thomas, Ser. No. 332,152, filed on Dec. 20, 1963, generates an output signal when the signal stored in the first sixteen bits 1 through 16 of shift register 135 corresponds with no more than two errors, to the predetermined pulse pattern 0110101001011010000. This pattern has been chosen because examination of the C code word and the R code word reveals that despite the presence of two errors in either this pattern of sixteen bits and two errors in either the G code word or the R code word, it is impossible for either the G or the R code words to be mistaken for the M code word. In addition, two or less errors in the M code word still make it possible to accurately determine the presence of the M code word.

The output of the M code detector 136 indicating that an M code has been detected is applied to an AND gate 137 which is enabled during the next occurring $\varphi_f$ signal to set a bistable circuit 139. The "1" output terminal of bistable circuit 139 is applied to an inhibit gate 143 which is enabled during the next occurring S bit of the transmitted signal. As a result, one frame after the M code word has been received the output of inhibit gate 143 is applied through OR gate 138 to set stage 1 of the shift register and reset all the other stages. This action creates a timing reference within the shift register during the seventeenth bit of the M code which is shifted through the register under the control of the $\varphi_s$ signal generated by the clock and framing circuit 30 during the occurrence of each S bit.

In addition to generating a timing mark in the shift register upon the occurrence of the seventeenth bit of an M code word, the output of inhibit gate 143 sets bistable circuit 140 whose output in turn upon the occurrence of the next framing bit is gated through AND gate 141 to set bistable circuit 142. Thus, bistable circuit 140 acts as an isolation circuit and the output of bistable circuit 142 is a signal designated $X_C$ which is applied both internally within the synchronizing signal receiver and in addition to the synchronizing receivers to indicate that the C code word is being received. The output of bistable circuit 142 is in addition used to reset bistable circuit 140. In addition, the $X_C$ signal is applied through an OR gate 146 to inhibit the inhibit gate 143 and effectively turn off the M code detector during the presence of a C code word.

The synchronizing receivers continue to receive a signal until the timing mark inserted in the nineteen stage shift register has been shifted to the nineteenth stage whereupon any portion of a received C code word indicating the insertion of control signals will have been received and detected by the synchronizing receivers as explained below. Accordingly, when the timing mark reaches the nineteenth stage of the shift register an AND gate 150 is enabled to set a bistable circuit 151 which generates a reference voltage $X_R$, at its "1" output terminal to inform the receiving apparatus to look for either a G code word or an R code word. In addition, the output of AND gate 150 is applied through OR gate 138 to set stage 1 of the shift register and reset all other stages so that a new timing mark is generated. The $X_R$ signal is also applied to an AND gate 152 which is enabled after three additional S bits have been received so that bistable circuit 142 is reset and, in addition, the $X_R$ signal inhibits the output of M code detector 136 by inhibiting inhibit gate 143. During the time interval between the second timing mark being inserted into the shift register 135 by the output of AND gate 150 and that timing mark reaching the seventeenth stage of shift register 135, the $X_R$ signal is applied to the synchronizing receivers to determine whether an R code word is present.

Still another signal is generated by the synchronizing signal receiver. This signal is designated as a C code pulse which is employed, as explained below, by the high speed synchronizing receivers, shown in FIG. 11, and the low speed distributor, shown in FIG. 13. The C code pulse is applied to the synchronizing receivers to check for a C code word indicating that one or more pulse transmitters have had a control signal inserted in their output signals. It is generated during the fifteenth S bit of each C code by an AND gate 155 which is enabled by the framing signal $\varphi_f$ from the clock and framing circuit.

Finally, provision must be made at the synchronizing signal receiver 40 for loss of synchronization. The clock and framing circuit 30 has a so-called shift pulse output terminal at which a pulse appears whenever the clock and framing circuit indicates an out of frame condition. This shift pulse is stretched by a pulse stretcher 133 and is used to reset all the stages of the shift register and start the process of looking for an M code word all over again. This is based on the assumption that whenever the system goes out of frame any timing marks or information stored in the nineteen stage shift register are in error and it is best to reset all the stages to zero and begin the process again.

Figure 11:
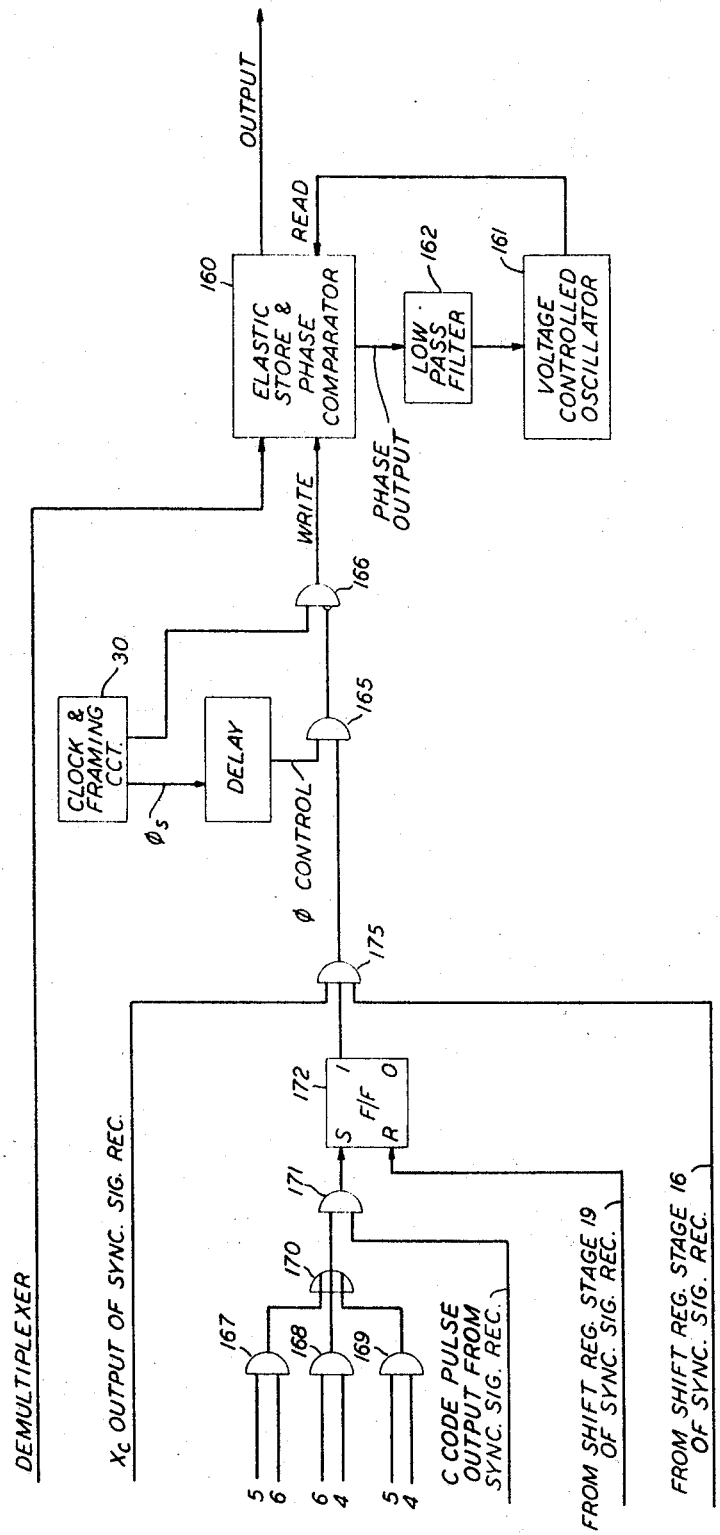
FIG. 11 is a block diagram of a synchronizing receiver for removing control signals from the pulse signals of a relatively high speed pulse transmitter.

A synchronizing receiver for one of the high speed pulse transmitters occupying one quarter of the high speed pulse transmission facility and transmitted in each third bit of every group of four bits is shown in FIG. 11. The incoming signals from the demultiplexer are applied to an elastic store 160, and the signals are written into the store under the control of the clock and framing circuit 30 which generates a write-in signal applied to the write terminal of the store during every third bit of every group of four bits of the transmission frame. That is to say, the transmission frame allocated to the transmission of signals from the synchronizing circuits 14, 15 . . . 16 is divided into thirty-six groups of four bits each, and the third bit of each group is allocated to the transmission of signals from this high speed pulse transmitter. Accordingly, these signals are read into the elastic store at such times, and the rest of the equipment shown in FIG. 11 serves to read out the pulse signals while deleting the control signals inserted by the synchronizing circuits in order to affect synchronization.

The read out of the elastic store 160 is controlled by a voltage controlled oscillator 161 which in turn is controlled by the phase output voltage of store 160. Toward this end the voltage controlled oscillator is connected to the phase output terminal of store 160 by means of a low pass filter 162. The voltage controlled oscillator generates a signal having a frequency equal to the average pulse transmission rate of the pulse transmitter when the store 160 is stored to one-half of its capacity. If the occupancy of store 160 is lower than one-half its capacity, the oscillator reduces its output frequency so that information is read out of the store at a slower rate. Conversely, if the occupancy of the store is high, the oscillator increases its output frequency to speed up the read out of pulse signals from the store.

As discussed above, control signals are inserted, when necessary, into a predetermined one of the time slots in a frame allocated to this pulse transmitter by the generation of a pulse, $\phi_{control}$, occurring during a particular one of such time slots, as shown in FIG. 3C. The signal $\phi_{control}$ can be most conveniently generated by delaying the $\phi_s$ signal from the clock and framing circuit 30 by a predetermined number of time slots such that the delayed signal occurs at that predetermined time. The $\phi_{control}$ signal is then combined with a signal generated by associated apparatus, to be described below, to activate an AND gate 165 to inhibit the inhibit gate 166 and thus prevent the writing of information into the store during that predetermined time slot when a control signal has been inserted therein.

The function of the apparatus shown in the left-hand portion of FIG. 11 is to ascertain when a control signal was inserted into the signal from the high speed pulse transmitter. For this purpose three AND gates 167, 168, and 169 are provided. AND gate 167 has its input terminal connected to the fifth and sixth stages of the shift register in the synchronizing signal receiver while AND gates 168 and 169 have their input terminals connected to the fourth and sixth and fourth and fifth stages, respectively, of that shift register. Upon the occurrence of the C code pulse from the synchronizing signal generators during the fifteenth bit of the C code word, one or more AND gates 167, 168, and 169 will be enabled to indicate that a C code corresponding to this pulse transmitter has been generated and a control signal inserted in the output signal from the high speed pulse transmitter whose signals are transmitted in the third bit of each group of four bits. This C code signal is stored in the fourth, fifth, and sixth stages of the shift register of the synchronizing signal receiver and one or more of these AND gates 167, 168, 169 will generate an output pulse at this time provided not more than one transmission error in the transmission of the C code has occurred, The output signals from AND gates 167, 168, and 169 are applied to the input of an OR gate 170 whose output together with the C code pulse signal from the synchronizing signal receiver enables an AND gate 171 to set a bistable circuit 172. The "1" output terminal of bistable circuit 172 is connected to one input terminal of an AND gate 175 whose second input terminal is connected to the $X_C$ output of the synchronizing signal receiver. The third input terminal of AND gate 175 is connected to the output terminal of shift register stage 16 of the synchronizing signal receiver so that AND gate 175 is enabled when the timing mark applied to the first stage of the shift register during the seventeeth bit of the M code reaches the sixteenth stage. It is precisely in this time slot that the control signals were inserted in the output of the high speed pulse transmitter at the transmitting terminal, and the output of AND gate 175 generates on output signal which combines with the $\phi_{control}$ signal to actuate AND gate 165 and inhibit gate 166 so that no information is read into the store. The fact that any control pulses were inserted into the output signals from the pulse transmitters at this time may be verified by noting that when the first timing mark has reached the sixteenth stage of the shift register 135 the fifteenth S bit of the C code word has just occurred and it is in this time interval as shown in FIG. 3 that control signals are inserted into the high speed signals.

There are 144 C code words generated between each R code word. Where low speed sources or both low and high speed sources are multiplexed together, apparatus must be provided at the receiving terminal to recognize when a C code word associated with a particular low speed source has been transmitted. Thus, for example, where three relatively high speed sources of, for example, 55 megabits per second are multiplexed onto a 220 megabit per second transmission line, thirty-six time slots of the transmission frame may be allocated for the transmission of data from relatively low speed sources having a pulse repetition rate of only 1.5 megabit per second. For this application, as explained above, the signals transmitted in the S bit time slots are divided into groups containing an M code word followed by C code words with three parts of each C code word allocated to the transmission of signals from the high speed sources and the remaining part allocated to all of the remaining thirty-six low speed sources. It is thus necessary to determine which of the thirty-six groups of C code words is being transmitted in order that the receiving apparatus can remove control signals from the proper low speed source. Thus, for example, the first part of a first C code word might be allocated to a first low speed pulse transmitter while in a second C code word the first part would be allocated to a second low speed pulse transmitter, and so forth.

Figure 12:
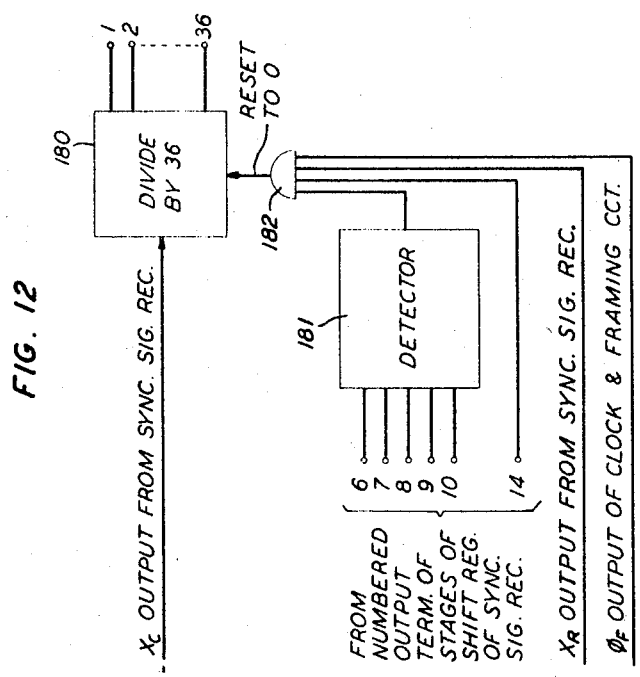
FIG. 12 is a block diagram of a receiving commutator circuit used at the receiving terminal when relatively low speed pulse transmitters are multiplexed.

The apparatus shown in FIG. 12 sequentially generates at the output of a divide by thirty-six circuit 180 thirty-six output signals between each R code word. Each output terminal is connected to a particular low speed synchronizing receiver, to be described below, associated with a particular low speed pulse transmitter, and it is the function of these output signals from the divide by thirty-six circuit 180 to enable a synchronizing receiver when the C code word associated with that receiver is being transmitted.

To accomplish the above purpose, the $X_C$ output signal from the synchronizing signal receiver shown in FIG. 10 is applied to the input of the divide by thirty-six circuit. Each of the output signals of the divide by thirty-six circuit enables an associated one of a low speed synchronizing signal receiver upon the occurence of the proper C code word, provided that the divide by thirty-six circuit is properly framed with reference to the generated R code. To accomplish this latter result, the equipment recognizes that whenever the timing mark generated by the AND gate 150 of the synchronizing signal receiver inserts a second timing mark in the nineteen stage shift register, then exactly fourteen S bit time slots later the sixth, seventh, eighth, ninth, and tenth stages of the nineteen bit shift register will contain an R code word when an R code word is received. A detector 181 produces an output signal whenever three out of the five of these stages produces an output signal indicating that an R code word has occurred, and the detector output signal is applied to a gate 182. Gate 182 generates the necessary signal to reset and thus frame the divide by thirty-six circuit 180 whenever the output of detector 181 indicates the reception of an R code word when a timing mark is in the fourteenth stage of this synchronizing signal receiver. At this time the $X_R$ output terminal of the synchronizing signal receiver generates an output signal and the above-mentioned three signals are gated through the AND gate 182 under the control of a framing pulse from the clock and framing circuit. The output signal from AND gate 182 indicating that an R code word has been detected is used to reset divider circuit 180 to zero to insure that the next C code word received is properly interpreted as the C code word allocated to a first low speed transmission source. In addition, the apparatus shown in FIG. 12 sequentially generates output signals at the thirty-six output terminals of divide by thirty-six circuit 180, and these output signals are used to control the low speed synchronizing signal receivers since they indicate that a C code word for a particular low speed source is being transmitted.

Figure 13:
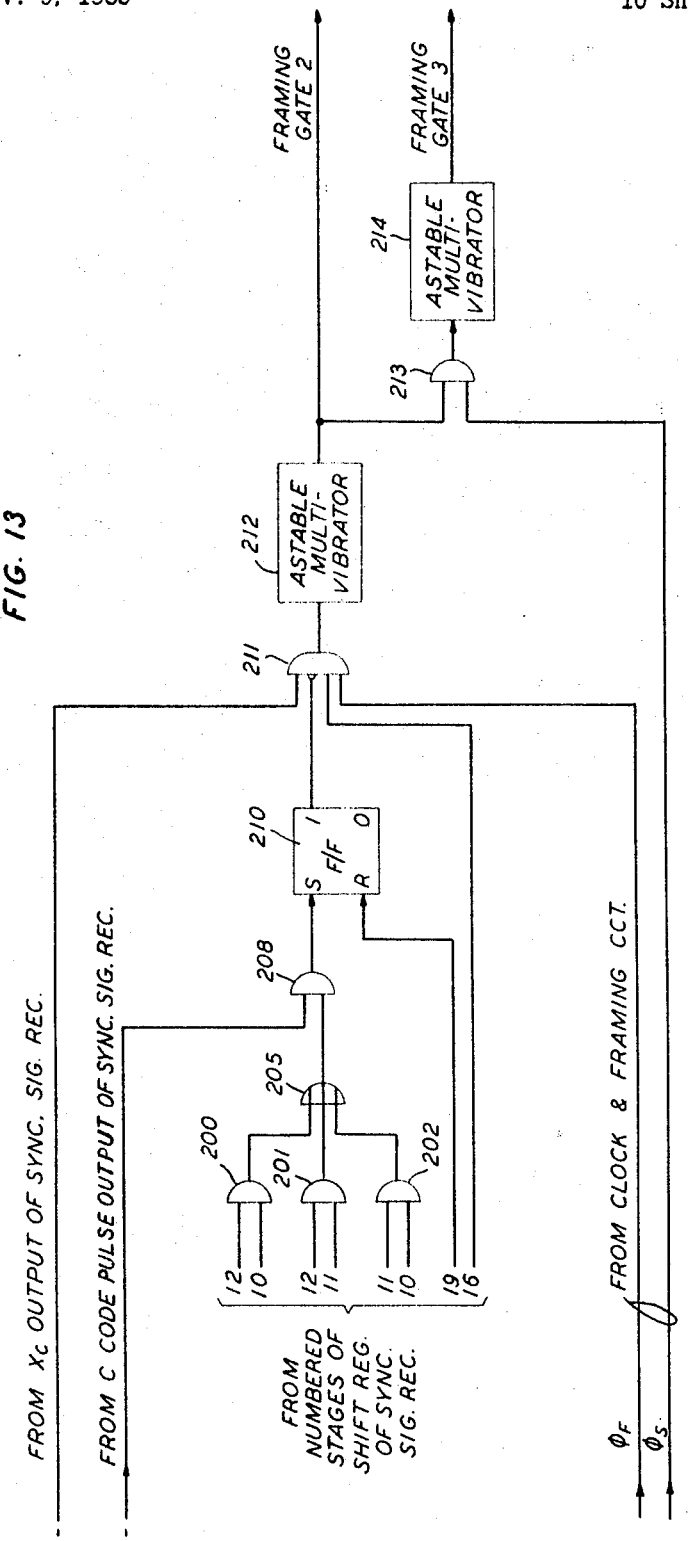
FIG. 13 is a distributor circuit used in conjunction with the receiving commutator circuit when the signals from relatively low speed pulse transmitters are multiplexed with the signals from relatively high speed pulse transmitters.

Associated with each group of thirty-six low speed pulse transmitters, the signals from each of which occupy one bit of the transmitted frame, is a so-called distributor circuit, shown in block diagram form in FIG. 13. The distributor circuit functions to generate gating signals to actuate the synchronizing receivers to delete a control signal from a demultiplexed transmitted signal. Parenthetically it should be noted that the equipment shown in FIG. 13 can accommodate low speed pulse transmitters, the sum of whose signals occupy one-quarter of the available transmission space on the transmission medium. Four of these distributors would therefore be required in the event that the entire transmission medium were allocated to the transmission of signals from low speed pulse transmitters.

The distributor shown in FIG. 13 has, an previously stated, the function of generating framing gate signals only when a C code word is generated indicating that a control signal has been inserted in one of the signals from one of the low speed pulse transmitters. Assuming as before for purposes of explanation that the first part of each C code word is allocated to the thirty-six low speed transmitters, then upon the occurrence of the C code pulse generated by the synchronizing signal receiver shown in FIG. 10 the entire C code has been read into the first through fourteenth stages of the nineteen bit shift register 135 in the synchronizing signal. Thus, if any of the low speed transmitters has had a control signal inserted in its output signal, marks will be present in the tenth, eleventh, and twelfth stages of the shift register of the synchronizing signal receiver since that is where the first part of the C code word is stored. Allowance for a transmission error in the transmission of the C code word is provided for by allowing the occurrence of a mark in just two of these three stages 10, 11, 12 of the shift register to actuate one of three AND gates 200, 201, or 202. The actuation of one of these AND gates produces an output signal to actuate OR gate 205. The output of OR gate 205 is applied through AND gate 208 during the presence of the C code pulse to set bistable circuit 210, the resulting reference voltage at its "1" output terminal then being gated through an AND gate 211 which is enabled by the $X_C$ signal from the signal generator and the output signal at the sixteenth stage of the shift register and a framing pulse. As a result, during the occurrence of a framing pulse from the clock and framing circuit and the timing mark in the sixteenth stage of the shift register 135, AND gate 211 produce an output signal. This output signal occurs upon the presence of the framing pulse located midway between the fifteenth and sixteenth transmitted S bits of the C code word, causing an astable multivibrator 212 having a period equal to one frame to generate a framing gate 2 signal during the period between the fifteenth and seventeenth S bits as shown in FIG. 3E. It is during the middle of this time interval that the time slots allocated for the insertion of control pulses in the low speed sources occurs, and this signal is therefore used in conjunction with others to delete the control pulses.

Since some low speed pulse transmitters have their control pulses inserted under the control of the framing gate 3 signal, as previously described, it is necessary to also generate the framing gate 3 signal at the distributor of the receiver shown in FIG. 13. To accomplish this the framing gate 2 signal is applied to AND gate 213 which is enabled during the occurrence of the sixteenth S bit of the C code to actuate an astable multivibrator 214 having a period of one frame to generate the framing gate 3 signal which corresponds to that shown in FIG. 3F.

Figure 14:
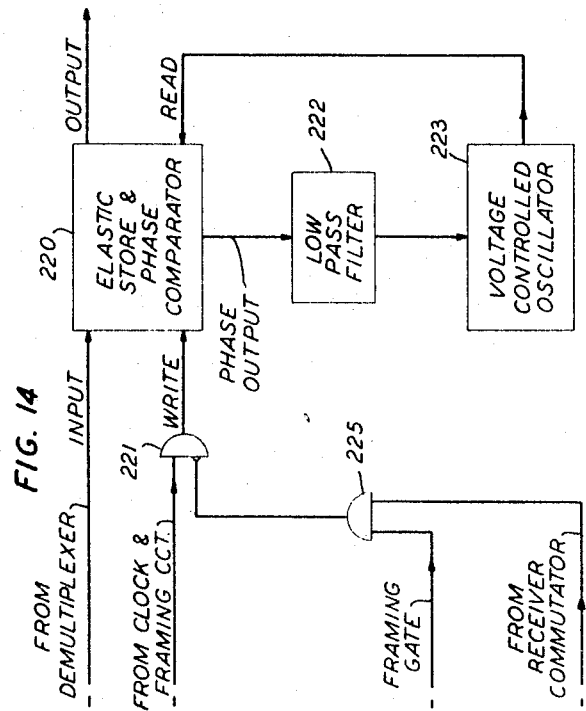
FIG. 14 is a synchronizing receiver used to remove control signals from the pulse signals of a relatively low speed pulse transmitter.

Each of the low pulse transmitters has associated with it a low speed synchronizing receiver, shown in FIG. 14, which is located at the receiving terminal. The apparatus shown in FIG. 14 is very similar to that shown in the upper portion of FIG. 11 with the exception of the fact that the signals used to inhibit the write in of pulse signals into the elastic store 220 are derived from the receiver commutator shown in FIG. 12 and the receiver distributor shown in FIG. 13.

The demultiplexed incoming signals for a particular low speed source are applied to the input terminal of the store 220 and are normally written into the store under the control of a clock signal provided by the framing and clock circuit which is applied to the write terminal of the elastic store 220 through an inhibit gate 221. As before, the pulse signals are normally read out of the store under the control of a voltage controlled oscillator 223 which is actuated by the phase output voltage of the comparator 220 through a low pass filter 222. The voltage controlled oscillator 223 produces an output voltage having a frequency equal to the average frequency of the low speed transmitted signal when the store 220 is half full. When the occupancy of the store is less than half full, the voltage controlled oscillator's output frequency decreases to reduce the read out rate and when the store's occupancy is more than half full the frequency of the oscillator increases.

The inhibit signals which inhibit the write in of control signals are obtained from the receiver commutator shown in FIG. 12 and the receiver distributor shown in FIG. 13. The receiver commutator has thirty-six output terminals each corresponding to a particular low speed pulse transmitter and each one is connected to a synchronizing receiver such as that shown in FIG. 14. Thus, each synchronizing receiver is associated with a particular transmitter, and depending upon whether control pulses are inserted during the framing gate 2 signal or the framing gate 3 signal in the transmitting terminal one or the other of these framing signals are combined with the output from the commutator to actuate AND gate 225 when a control signal has been inserted in the signal from a particular pulse transmitter. In this manner the control signals are deleted from the transmitted signal.

It is to be understood that the above-described arrangements are illustrative of the application of the principles of the invention. Numerous other arrangements may be devised by those skilled in the art without departing from the spirit and scope of the invention. For example, only one time slot of every other frame of the transmitted signal might be allocated for the transmission of information regarding the insertion of control signals. This would be entirely proper where such a single bit in every other frame can accommodate the control signals generated. In addition, it should be recognized that synchronization of signals with nominal bit rates which are various multiples of other basic rates can also be accommodated, and the invention is not limited to those described as examples above.

What is claimed is:

1. In combination, a plurality of $n$ asynchronous pulse transmitters whose pulse trains are to be multiplexed on a common time divided pulse transmission facility, means at the transmitting terminal of said transmission facility for converting the pulse repetition rate of each of said pulse trains to a common higher pulse repetition rate by the insertion of control signals into each pulse train, means at the transmitting terminal for multiplexing said converted pulse trains on said common time divided transmission facility, means at the transmitting terminal of said facility for generating a first predetermined code word to establish a time reference, means for generating a second predetermined code word composed of $n$ portions, each portion being allocated to a predetermined one of said pulse transmitters to indicate the presence of an inserted control signal in the pulse train from any of said pulse transmitters, means for sequentially transmitting each bit of said first and then said second code words in a predetermined portion of the transmitting space of said transmission facility, means to generate a third predetermined code which is sequentially transmitted in said predetermined portion of said transmission facility after said first and second words, means to repeat the transmission of said first, second, and third codes to continuously re-establish said time reference and determine the presence of an inserted control signal in the pulse train from any pulse transmitter, means at the receiving terminal for demultiplexing the transmitted signals, means at the receiving terminal to continuously recreate said time references in response to the reception of said first code words, and means at said receiving terminal responsive to said time references generated at said receiving terminals and the reception of said second generated codes for removing inserted control signals from the demultiplexed signals.

2. In combination, a plurality of asynchronous pulse transmitters whose pulse trains are to be multiplexed on a common time divided pulse transmission facility, the number $n$ of such pulse transmitters being equal to the number of bits in a frame of said transmission facility allocated to the transmission of signals from said pulse transmitters, means at the transmitting terminal of said transmission facility for converting the pulse repetition rate of each of said pulse trains to a common higher pulse repetition rate by the insertion of control signals into each pulse train, means at the transmitting terminal for multiplexing said converted pulse trains on said common time divided transmission facility, means at the transmitting terminal for generating a first predetermined code word to establish a time reference, means for generating a second predetermined code word composed of X portions, where X equals the number of bits $n$ in a frame of said transmission facility allocated to the transmission of signals from said pulse transmitters divided by a positive integer greater than 1 and less than $n$ which yields a quotient having no remainder, each portion of second code words being assigned to a particular one of a group of X transmitters to indicate the presence of an inserted control signal in the pulse trains of a pulse transmitter of said first group of X pulse transmitters, means for sequentially transmitting each bit of said first and then said second codes in a predetermined portion of the space available on said transmission facility, means to generate a third predetermined code word which is sequentially transmitted in said predetermined portion of the space available on said transmission facility after the transmission of said second code word, means to continuously repeat the transmission of said first, second, and third code words with each successive transmission of said second code word used to indicate the presence of an inserted control signal in the pulse train from any pulse transmitter of a second, third, fourth, fifth . . . etc. group of X pulse transmitters, means to continue repeating the transmission of said first, second, and third code words with each successive second code word being devoted to another group of X code transmitters until a second code word has been generated for each pulse transmitter to indicate the presence of any control signals in the output signals of the pulse transmitters, means to then generate a fourth code word following the generation of a second code word for the last group of pulse transmitters, said fourth code word being generated instead of said third code word to establish a framing reference for the second code words, means at the receiving terminal for demultiplexing the transmitted signals, means at the receiving terminal to continuously recreate said time and framing references in response to said first and said fourth code words respectively, and means at said receiving terminal responsive to said time and framing references generated at said receiving terminal and the reception of said second generated codes for removing inserted control signals from the demultiplexed signals.

3. Apparatus in accordance with claim 2 wherein said means at the transmitting terminal for converting the pulse repetition rate of each of said pulse trains to a common higher repetition rate by the insertion of control signals into each pulse train and said means for generating and transmitting said second predetermined code words comprises, in combination, an elastic store having a pulse input terminal, a pulse output terminal, and a phase output terminal at which a voltage is generated indicative of the occupancy of said store, means for applying one of said asynchronous pulse trains from a pulse transmitter to the pulse input terminal of said store, comparison means connected to the phase output terminal of said store for generating an output signal when the occupancy of said elastic store falls below a predetermined value, means for periodically examining the output signal from said comparison means during a time interval immediately preceding the generation of said second predetermined code word composed of X portions wherein one of said portions is assigned to said pulse transmitter by enabling an AND gate, a bistable circuit connected to receive the output signal from said AND gate to generate a signal indicative of the fact that a control signal should be inserted in the output signal from said elastic store, gating means connected to receive the output signal from said bistable circuit to inhiibt the readout of pulse signals from said elastic store and thereby insert a control signal, a second AND gate connected to receive the output signals from said bistable circuit during the time of occurrence of said second code word to generate a signal indicative of the fact that a control signal has been inserted into the output signal from a pulse transmitter, a third AND gate which is enabled by the output signal from said second AND gate during predetermined time slots following the generation of an output signal by said second AND gate to generate consecutive marking pulses in a predetermined part of a predetermined portion of said second code to indicate to the receiving apparatus that a control signal has been inserted in the output of said pulse transmitter.

4. In combination, a plurality of asynchronous pulse transmitters whose pulse trains are to be multiplexed over a common time divided pulse transmission facility divided into frames, a first class of said transmitters each having a pulse repetition rate such that a single time slot in each frame of the transmission facility has sufficient capacity to transmit the pulse signals from such a pulse transmitter, a second class of pulse transmitters each of whose pulse repetition rates is such that it requires one quarter of the available information carrying time slots of said transmission facility to be transmitted, means at the transmitting terminal of said transmission facility for converting the pulse repetition rate of each of said pulse transmitters of said first class to a common higher repetition rate by the insertion of control signals into each pulse train, means at the transmitting terminal of said transmission facility for converting the pulse repetition rate of each of said pulse transmitters of said second class to a common higher frequency, means at the transmitting terminal for multiplexing said converted pulse trains on said common transmission facility, means at the transmitting terminal for generating a first predetermined code word to establish a time reference, means for generating a second predetermined code word composed of X portions, where X equals the number of bits $n$ in a frame of said transmission facility allocated to the transmission of information divided by four, each portion of said second code word being assigned to one pulse transmitter of said second class and each remaining portion being assigned to a pulse transmitter of said first class to indicate the presence of an inserted control signal in the pulse transmitters of said second class or in a first group of X minus Z of said pulse transmitters of said first class where Z is the number of pulse transmitters of said second class to be multiplexed, means for sequentially transmitting each bit of said first and then said second codes in a predetermined portion of said time divided transmission facility, means to generate a third predetermined code word which is sequentially transmitted in said predetermined portion of said transmission facility, means to continuously repeat the transmission of said first, second, and third code words with each successive transmission of said second code word being used to indicate any presence of an inserted control signal in the pulse train from any pulse transmitter of said second class and from successive groups of said pulse transmitters of said first class until a second code word has been generated for each pulse transmitter of said first class to indicate the presence of any control signals in the output signals from said pulse transmitters, means to then generate a fourth code word following the generation of a second code for the pulse transmitters of said second class and the last group of pulse transmitters of said first class said fourth code word being generated instead of said third code to establish a framing reference for the second code signals, means at the receiving terminal for demultiplexing the transmitted signals, means at the receiving terminal to continuously recreate said time and framing references in response to said first and said fourth codes respectively, and means at said receiving terminal responsive to said references generated at said receiving terminal and the reception of said second generated code words for removing inserted control signals from the demultiplexed signals.

5. Apparatus in accordance with claim 4 wherein said means to generate and transmit said first predetermined code comprises, in combination, a shift register having at least S stages where S is the number of bits in said first predetermined code word, means to insert a marking pulse in the first stage of said shift register and a space in all other stages, means to shift said marking pulse through said shift register under the control of a signal generated during each said predetermined bit of said transmission frame in which said code signals are transmitted, an OR gate connected to the output terminals of selected stages of said shift register so that the signal appearing at the output terminal of said OR gate constitutes said first code word, an AND gate connected to receive the output of said OR gate, a divide by three circuit connected to receive an input signal from the output of one of the stages of said shift register, the output signal from the first output terminal of said divide by three circuit indicating that the time of occurrence of said first code word is present, means to enable said AND gate with said output signal from said first output terminal of said divide by three circuit, a second OR gate connected to receive the output of said AND gate, and a second AND gate the output terminal of said second OR gate being connected to one input terminal of said second AND gate which is enabled by a signal applied to a second input terminal during each predetermined bit of said transmission frame during which a code bit is transmitted.

6. Apparatus in accordance with claim 4 wherein said means for converting the pulse repetition rate of each of said pulse trains from pulse transmitters of said second class to a common higher repetition rate by the insertion of control signals and said means for generating the part of each portion X of said second predetermined code assigned to said pulse transmitter comprises, in combination, an elastic store having a pulse input terminal, a pulse output terminal, and a phase output terminal at which a voltage is generated indicative of the occupancy of said store, means for applying said asynchronous pulse train from said pulse transmitter of said second class to the pulse input terminal of said store, means for reading pulse signals out of said store at a predetermined rate, comparison means connected to the phase output terminal of said store to generate an output signal when the occupancy of said elastic store falls below a predetermined value, means for periodically examining the output signal from said comparison means during the occurrence of each of said first predetermined code words and generating an output signal from a first AND gate when the occupancy of said store has fallen below a predetermined value at that time, a bistable circuit connected to receive the output signal from said first AND gate to generate a reference indicative of the fact that a control signal is to be inserted in the output signal from said elastic store, gating means connected to receive the output signal from said bistable circuit to inhibit the readout of pulse signals from said elastic store, and a second AND gate which is enabled by the output voltage from said bistable circuit during the time allocated to the occurrence of said second code word to generate said second predetermined code word indicative of the fact that a control signal has been inserted into the output signal from a pulse transmitter of said second class of pulse transmitters.

7. Apparatus in accordance with claim 4 wherein said means at the transmitting terminal for converting the pulse repetition rate of each of said pulse trains from a pulse transmitter of said first class to a common higher repetition rate by the insertion of control signals and said means for generating that part of a portion X of said second predetermined code assigned to said pulse transmitter of said first class comprises, in combination, an elastic store having a pulse input terminal, a pulse output terminal, and a phase output terminal at which a voltage is generated indicative of the occupancy of said store, means for applying one of said asynchronous pulse trains from a pulse transmitter of said first class of pulse transmitters to the pulse input terminal of said store, means to read out the pulse signals from said elastic store at a predetermined rate, comparison means connected to the phase output terminal of said store for generating an output signal when the occupancy of said elastic store falls below a predetermined value, means for periodically examining the output signal from said comparison means during a time interval immediately preceding the generation of said second predetermined code composed of X portions wherein one of the parts P of one of said portions is assigned to said pulse transmitter by enabling an AND gate, a bistable circuit connected to receive the output signal from said AND gate to generate a signal indicative of the fact that a control signal should be inserted in the output signal from said elastic store, gating means connected to receive the output signal from said bistable circuit to inhibit the readout of pulse signals from said elastic store and thereby insert a control signal in the output signal from said elastic store, a second AND gate connected to receive the output signals from said bistable circuit during the time of occurrence of said second code word to generate a signal indicative of the fact that a control signal has been inserted into the output signal from a pulse transmitter, and a third AND gate which is enabled during predetermined time slots following the generation of an output signal by said second AND gate to generate consecutive marks in a predetermined part of a predetermined portion of said second code to indicate to the receiving apparatus that a control signal has been inserted in the output of said pulse transmitter.

8. In combination, a plurality of asynchronous pulse transmitters whose output pulse trains are to be multiplexed on a common time divided pulse transmission facility, means at the transmitting terminal of said facility for converting the pulse repetition rate of each of said pulse trains to a common higher pulse repetition rate by the insertion of control signals into each pulse train, means at said transmitting terminal for multiplexing said converted pulse trains on said common time divided transmission facility, means at the transmitting terminal of said facility for generating a first predetermined code word to establish a time reference comprising, a shift register having at least S stages where S is the number of time slots in said first predetermined code, means to insert a marking pulse in the first stage of said shift register and a space in all other stages, means to shift said marking pulse through said shift register under the control of a signal generated during a predetermined time slot of said transmission frame in which said code signals are transmitted, an OR gate connected to the output terminals of selected stages of said shift register so that the signal appearing at the output terminal of said OR gate constitutes said first code word, an AND gate connected to receive the output of said OR gate, a divide by three circuit connected to receive an input signal from the output of one of the stages of said shift register, the output signal from the first output terminal of said divide by three circuit indicating that the time of occurrence of said first code word is present, means to enable said AND gate with said output signal from said first output terminal of said divide by three circuit, a second OR gate connected to receive the output of said AND gate, and a second AND gate the output terminal of said second OR gate being connected to one input terminal of said second AND gate which is enabled by a signal applied to a second input terminal during each predetermined time slot of said transmission frame during which a code bit is transmitted, means for generating a second predetermined code word to indicate the presence of an inserted control signal, means for sequentially transmitting each bit of said first and then said second code words in a predetermined portion of said common time divided pulse transmission facility, means at the receiving terminal of said transmission facility for demultiplexing the transmitted signals, means at said receiving terminal to create a time reference in response to the reception of said first code word, and means at said receiving terminal responsive to said time reference generated at said receiving terminal and the reception of said second generated code word for removing inserted control signals from the demultiplexed signals.

9. In combination, a plurality of asynchronous pulse transmitters whose output pulse trains are to be multiplexed on a common time divided pulse transmission facility, means at the transmitting terminal of said facility for converting the pulse repetition rate of each of said pulse trains to a common higher pulse repetition rate by the insertion of control signals into each pulse train, means at said transmitting terminal for multiplexing said converted pulse trains on said common time divided transmission facility, means at the transmitting terminal of said facility for generating a first predetermined code word to establish a time reference, means for generating a second predetermined code word to indicate the presence of an inserted control signal, means for sequentially transmitting each bit of said first and then said second code words in a predetermined portion of said common time divided pulse transmission facility, wherein said means at the transmitting terminal for converting the pulse repetition rate of each of said pulse trains to a common higher pulse repetition rate by the insertion of control signals into each pulse train and said means for generating said second predetermined code word comprises, in combination, an elastic store having a pulse input terminal, a pulse output terminal, and a phase output terminal at which a voltage is generated indicative of the occupancy of said store, means for periodically reading pulse signals out of said store, means for applying one of said asynchronous pulse trains from a pulse transmitter to the pulse input terminal of said store, comparison means connected to the phase output terminal of said store to generate an output signal when the occupancy of said elastic store falls below a predetermined value, means for periodically examining the output signal from said comparison means at a predetermined examining time and generating an output signal from a first AND gate when the occupancy of said store has fallen below a predetermined value at that time, a bistable circuit connected to receive the output signal from said first AND gate to generate a reference signal indicative of the fact that a control signal is to be inserted in the output signal from said elastic store, gating means connected to receive the output signal from said bistable circuit to inhibit the readout of pulse signals from said elastic store, and a second AND gate which is enabled by the output voltage from said bistable circuit during the time allocated to the occurrence of said second code word to generate said second predetermined code indicative of the fact that a control signal has been inserted into the output signal from a pulse transmitter, means at the receiving terminal of said transmission facility for demultiplexing the transmitted signals, means at said receiving terminal to create a time reference in response to the reception of said first code, and means at said receiving terminal responsive to said time reference generated at said receiving terminal and the reception of said second generated code word for removing inserted control signals from the demultiplexed signals.

10. In combination, a plurality of asynchronous pulse transmitters whose output pulse trains are to be multiplexed on a common time divided pulse transmission facility, means at the transmitting terminal of said facility for converting the pulse repetition rate of each of said pulse trains to a common higher pulse repetition rate by the insertion of control signals into each pulse train, means at said transmitting terminal for multiplexing said converted pulse trains on said common time divided transmission facility, means at the transmitting terminal of said facility for generating a first predetermined code word to establish a time reference, means for generating a second predetermined code word to indicate the presence of an inserted control signal, means for sequentially transmitting each bit of said first and then said second code words in a predetermined portion of said common time divided pulse transmission facility, means at the receiving terminal of said transmission facility for demultiplexing the transmitted signals, means at said receiving terminal to create a time reference in response to the reception of said first code word comprising, a shift register having an input terminal and at least S stages where S is the number of bits in said first predetermined code, means to apply said signals transmitted in said predetermined portion of said transmission facility allocated to the transmission of said codes to said input terminal of said shift register, means to shift said shift register in response to each such received predetermined bit, detector means to detect the presence of said first predetermined code in said shift register, and means responsive to said detector means to insert a timing mark in said first stage of said shift register upon the occurrence of said first predetermined bit, and means at said receiving terminal responsive to said time reference generated at said receiving terminal and the reception of said second generated code word for removing inserted control signals from the demultiplexed signals.

11. In combination, a plurality of asynchronous pulse transmitters whose output pulse trains are to be multiplexed on a common time divided pulse transmission facility, means at the transmitting terminal of said facility for converting the pulse repetition rate of each of said pulse trains to a common higher pulse repetition rate by the insertion of control signals into each pulse train, means at said transmitting terminal for multiplexing said converted pulse trains on said common time divided transmission facility, means at the transmitting terminal of said facility for generating a first predetermined code word to establish a time reference, means for generating a second predetermined code word to indicate the presence of an inserted control signal, means for sequentially transmitting each bit of said first and then said second code words in a predetermined time slot of said common time divided pulse transmission facility, means at the receiving terminal of said transmission facility for demultiplexing the transmitted signals, means at said receiving terminal to create a time reference in response to the reception of said first code comprising, a shift register having an input terminal and at least S stages where S is the number of bits in said first predetermined code word, means connecting the input terminal of said shift register to receive signals generated during each predetermined bit of each transmission frame allocated to the transmission of said first and second code words, means to shift said shift register in response to each such received predetermined bit, deterctor means connected to the output terminals of the stages of said shift register to detect the presence of said first predetermined code word in said shift register, a first bistable circuit, means connecting the input terminal of said first bistable circuit to the output terminal of said detector means to cause said first bistable circuit to generate a reference voltage in response to the reception of said first predetermined code word, an inhibit gate which is enabled during the occurrence of the next received bit of said transmission frame allocated to the transmission of said code words following the detection of said first predetermined code word and which is connected to receive the reference voltage generated by said first bistable circuit in response to the reception of said first received code, means responsive to the output signal generated by said inhibit gate to set the first stage of said shift register so that it stores a marking pulse therein and to reset all the other stages so that a space is stored in each of them, a second bistable circuit connected to receive the output signal from said inhibit gate and in response thereto generate a reference voltage at its output terminal, an AND gate connected to receive the output signal from said second bistable circuit which is enabled during the same frame of said transmission facility as that in which said second bistable circuit is caused to generate an output signal, a third bistable circuit connected to receive the output signal from said AND gate to generate a gating voltage during the time of occurrence of said second predetermined code word, and means at said receiving terminal responsive to said time reference generated at said receiving terminal and the reception of said second generated code for removing inserted control signals from the demultiplexed signals.

12. In combination, a plurality of asynchronous pulse transmitters whose output pulse trains are to be multiplexed on a common time divided pulse transmission facility, means at the transmitting terminal of said facility for converting the pulse repetition rate of each of said pulse trains to a common higher pulse repetition rate by the insertion of control signals into each pulse train, means at said transmitting terminal for multiplexing said converted pulse trains on said common time divided transmission facility, means at the transmitting terminal of said facility for generating a first predetermined code word to establish a time reference, means for generating a second predetermined code word to indicate the presence of an inserted control signal, means for sequentially transmitting each bit of said first and then said second code words in a predetermined time slot of said common time divided pulse transmission facility, means at the receiving terminal of said transmission facility for demultiplexing the transmitted signals, means at said receiving terminal to create a time reference in response to the reception of said first code word and means at said receiving terminal responsive to said time reference generated at said receiving terminal and the reception of said second generated code for removing inserted control signals from the demultiplexed signals comprising, an elastic store having a pulse input terminal, a pulse output terminal, and a control terminal to which an applied signal governs the writing into said store of said demultiplexed signals, an inhibit gate having an input terminal, an output terminal, and an inhibit terminal and having its output terminal connected to said control terminal of said elastic store, a clock and framing circuit having its output terminal connected to the input terminal of said inhibit gate so that in the absence of signals applied to the inhibit terminal of said inhibit gate pulse signals are read into said elastic store under the control of said clock and framing circuit, and means responsive to the time reference generated at said receiving terminal at the reception of said second generated code connected to said inhibit terminal of said inhibit gate.

References Cited

UNITED STATES PATENTS

| | | | |
|---|---|---|---|
| 3,353,158 | 11/1967 | David et al. | 179—15 |
| 3,334,183 | 8/1967 | Swift | 179—15 XR |
| 2,719,188 | 9/1955 | Pierce | 179—15 |
| 3,136,861 | 6/1964 | Mayo | 179—15 |
| 3,229,259 | 1/1966 | Barker et al. | 179—15 XR |

ROBERT L. GRIFFIN, Primary Examiner

CARL R. von HELLENS, Assistant Examiner

U.S. Cl. X.R.

178—50